US011450145B2

(12) United States Patent
Worrall et al.

(10) Patent No.: US 11,450,145 B2
(45) Date of Patent: Sep. 20, 2022

(54) SYSTEM AND METHOD FOR MONITORING PROCEDURE COMPLIANCE

(71) Applicant: DISNEY ENTERPRISES, INC., Burbank, CA (US)

(72) Inventors: John David Worrall, Clermont, FL (US); Shawn Allen Boling, Davenport, FL (US); Ronald J. Dearing, Windermere, FL (US); Gregory Brooks Hale, Orlando, FL (US); Scott William Rench, Windermere, FL (US)

(73) Assignee: Disney Enterprise, Inc., Burbank, CA (US)

( * ) Notice: Subject to any disclaimer, the term of this patent is extended or adjusted under 35 U.S.C. 154(b) by 432 days.

(21) Appl. No.: 16/531,930

(22) Filed: Aug. 5, 2019

(65) Prior Publication Data
US 2019/0354753 A1    Nov. 21, 2019

Related U.S. Application Data

(63) Continuation-in-part of application No. 15/485,896, filed on Apr. 12, 2017, now Pat. No. 10,417,896.

(51) Int. Cl.
*G06V 40/20* (2022.01)
*G09B 19/00* (2006.01)
(Continued)

(52) U.S. Cl.
CPC .............. *G06V 40/20* (2022.01); *G06V 20/41* (2022.01); *G06V 40/10* (2022.01); *G06V 40/1365* (2022.01); *G09B 19/003* (2013.01)

(58) Field of Classification Search
CPC ........... G06K 9/00335; G06K 9/00087; G06K 9/00362; G06K 9/00718; G06K 9/00006;
(Continued)

(56) References Cited

U.S. PATENT DOCUMENTS 5,277,662 A * 1/1994 Fox .................... A63G 31/02
104/73
6,727,818 B1 * 4/2004 Wildman ............... G16H 50/80
340/573.1
(Continued)

OTHER PUBLICATIONS

Naticchia, Berardo, "A monitoring system for real-time interference control on large construction sites", Automation in Construction 29 (2013) 148-160. Year 2013.*

*Primary Examiner* — Chan S Park
*Assistant Examiner* — Elisa M Rice
(74) *Attorney, Agent, or Firm* — Snell & Wilmer L.L.P.; Kent A. Lembke

(57) ABSTRACT

A method of monitoring a user performing a handwashing procedure, including: recognizing a user based upon biometric information obtained at a handwashing station, a user; detecting use of a component of the handwashing station; capturing image data of the user at the handwashing station; capturing data describing components and consumables used at the handwashing station; analyzing, using a processor, the image data; determining compliance with a handwashing procedure based at least in part on the analysis of the image data and the use of the component; and communicating compliance information.

10 Claims, 17 Drawing Sheets

(51) Int. Cl.
*G06V 20/40* (2022.01)
*G06V 40/10* (2022.01)
*G06V 40/12* (2022.01)

(58) Field of Classification Search
CPC ........... G06K 9/00221; G06K 9/00342; G09B 19/003
See application file for complete search history.

(56) References Cited

U.S. PATENT DOCUMENTS

| | | | |
|---|---|---|---|
| 9,050,517 B2* | 6/2015 | Oliver | A63B 69/18 |
| 10,777,005 B2* | 9/2020 | Grossman | G08B 5/36 |
| 2004/0003751 A1* | 1/2004 | Albrich | B61B 12/002 |
| | | | 104/27 |
| 2006/0132284 A1* | 6/2006 | Murphy | G05B 19/042 |
| | | | 340/5.7 |
| 2016/0197918 A1* | 7/2016 | Turgeman | G06F 21/316 |
| | | | 726/4 |
| 2016/0307459 A1* | 10/2016 | Chestnut | G06F 3/14 |

* cited by examiner

SYSTEM AND METHOD FOR MONITORING PROCEDURE COMPLIANCE

CROSS REFERENCE TO RELATED APPLICATIONS

This application is a continuation-in-part of U.S. patent application Ser. No. 15/485,896, filed Apr. 12, 2017, which is incorporated herein by reference in its entirety.

BACKGROUND

Compliance with policies and procedures is often important to ensure health and safety for personnel as well as those many products and services related to the policies and procedures. For example, a company may have lab procedures to be followed when conducting experiments using biohazardous materials. Failure to follow the procedure may result in contamination, health risks to the personnel conducting the experiment and people who may come in contact with the user, compromise results, and other problematic scenarios.

In a specific example, in food handling processes in commercial kitchens, as well as in the medical industry, there is an inherent risk of spreading illness if employees do not follow proper procedures for hand sanitation, e.g., during food preparation, between patient visits, etc. There are mandatory requirements that should be followed for proper handwashing, often specific to the industry or context. However, to a large extent the state of the art relies solely upon employee training and hand written policies.

State of the art approaches for monitoring include identifying personnel who are assigned to perform a task together with operation of various tools used in the task performance. An employee badge can be used to determine whether assigned personnel are located in the vicinity of the required tools and serve as an indirect indicator that the assigned personnel used the tools to complete the task such as when a badge is detected near a handwashing station. However, this simply confirms presence and does not address actual compliance with a handwashing procedure. Furthermore, wearable identification devices such as badges can themselves be sources of contamination or other process compromise, such as transfer of badge to "other" untrained personnel.

SUMMARY

In summary, an embodiment provides a method of monitoring a user performing a handwashing procedure, comprising: recognizing a user based upon biometric information obtained at a handwashing station, a user; detecting use of a component of the handwashing station; capturing image data of the user at the handwashing station; capturing data describing components and consumables used at the handwashing station; analyzing, using a processor, the image data; determining compliance with a handwashing procedure based at least in part on the analysis of the image data and the use of the component; and communicating compliance information.

More generally, an embodiment provides a method for monitoring a user performing an operational process, comprising: recognizing the user and an operational process being performed by the user; ascertaining a task of the operational process to be performed by the user; and determining whether the user has complied with a compliance step, wherein the compliance step is to be completed prior to the performance of the task; wherein the determining comprises determining whether biometric data from the user has been obtained, wherein the biometric data is obtained using at least one biometric sensor operatively coupled to an object used in completing the compliance step.

Another aspect of the invention provides a system for monitoring a user performing an operational process, comprising: an electronic device that includes a processor; a memory device that stores instructions executable by the processor to: identify the user and an operational process being performed by the user; ascertain a task of the operational process to be performed by the user; and determine whether the user has complied with a compliance step, wherein the compliance step is to be completed prior to the performance of the task; wherein to determine comprises determining whether biometric data from the user has been obtained, wherein the biometric data is obtained using at least one biometric sensor operatively coupled to an object used in completing the compliance step.

Another embodiment provides a system for monitoring a user performing a handwashing procedure, comprising: a handwashing station; a biometric sensor that recognizes a user at the handwashing station; a component of the handwashing station that is required to be used during the handwashing procedure; an image sensor that captures image data of the user at the handwashing station; and a processor that: analyzes the image data; determines compliance with a handwashing procedure based at least in part on the analysis of the image data and use of the component; and thereafter communicates compliance information.

A further embodiment provides a method for monitoring a user performing an operational process, comprising: identifying the user and an operational process being performed by the user; ascertaining a task of the operational process to be performed by the user; and determining whether the user has complied with a compliance step, wherein the compliance step is to be completed prior to the performance of the task; wherein the determining comprises determining whether biometric data (which may be nearly any data useful for identifying a user such as data used by or output from RFID, video analysis, and so on) from the user has been obtained, wherein the biometric data is obtained using at least one biometric and/or "other" unique non-biometric data collection sensor operatively coupled to an object used in completing the compliance step.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

The scope of the embodiments will be pointed out in the appended claims.

DETAILED DESCRIPTION

Figure 1:
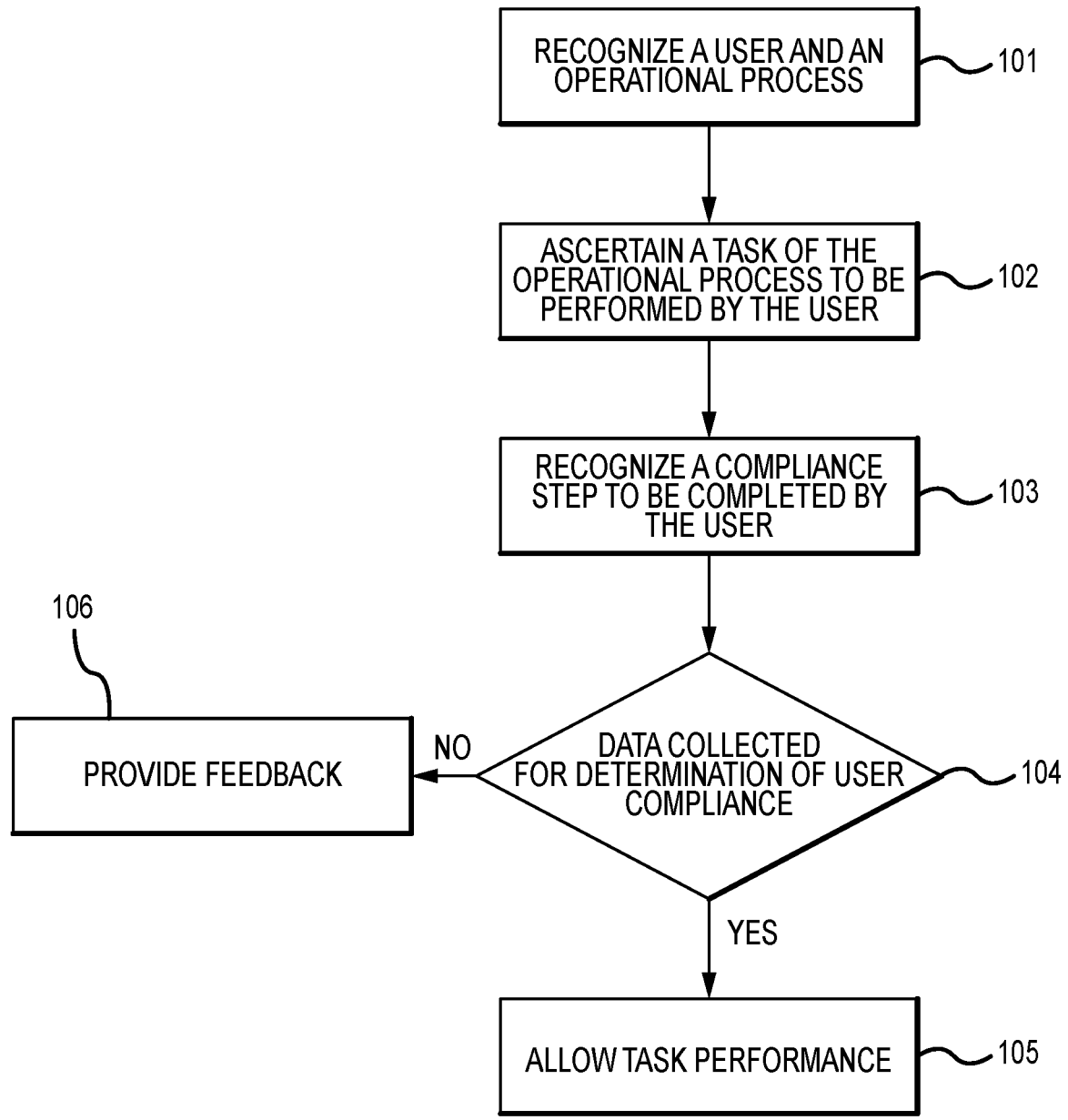
FIG. 1 illustrates an example method for monitoring performance of an operational process.

Policies and procedures include tasks that are considered critical control points or tasks that must be completed to ensure desired task performance. Examples of critical control points or tasks may include standards for access to sensitive areas, proper qualifications to handle particular chemicals, security clearances, proper cleanliness, and the like. In some cases, when the employee or user performing the operational process fails to comply with the requirements of the critical control point or task, the user should not move to the next task in the operational process.

However, ensuring that employees or users follow the policies and procedures, especially critical compliance steps, is difficult. Current methods rely on training the employees and users regarding the policy and procedures. The current methods rely heavily on written procedures, training, and relying on personnel to read and follow the procedures. Thus, current methods rely on self-discipline and self-policing of employees and users tasked with operational processes, particularly critical compliance steps. Even with exceptional training and personnel compliance efforts continuous compliance improvement is desirable.

Some current systems integrate electronic transmitters and receivers (e.g., radio frequency identification (RFID) tags, near field communication devices, etc.) to determine if a user or employee has been near a location related to the compliance step. For example, an employee badge may include an RFID tag that can recognize when the employee is in the same vicinity of a hand wash station. However, such techniques only indicate whether the user is close to a location associated with the compliance step. These techniques do not indicate whether the user actually completed the compliance step. Using the example above, the RFID tag cannot recognize that the employee actually washed his/her hands and/or an employee "borrowed" another authorized employee badge to game the system.

Accordingly, an embodiment provides a method for monitoring a user performing an operational process and the user's compliance with critical steps within the operational process. An embodiment recognizes a user and an operational process to be performed by the user. Recognizing the user may include recognizing the specific user (e.g., the user is "John," the user is "Employee 5," etc.), recognizing a category or role of the user (e.g., chef, lab technician, etc.), and the like. The operational process may be a task or group of tasks that need to be completed to perform an overall operation. For example, the operational process may include preparing a particular meal which involves both safety processes as well as processes that involve selecting and preparing ingredients according to a recipe.

The system may ascertain a task of the operational process to be performed by the user. Using the meal preparation example above, one of the tasks that the user has not performed yet may be marinating chicken. An embodiment may determine whether the user has completed a compliance step that is to be completed before the user performs the ascertained task. The compliance step includes the user washing his/her hands for a specified period of time, with specified cleaning agent at a specified water temperature before moving to the step after marinating the chicken. In one embodiment, determining whether the user has completed the compliance step includes obtaining biometric information and/or sensed information when the user is using an object or tool, and sensed information about consumable products used to complete the compliance step. The biometric data may be obtained from a biometric sensor that is selected and configured to avoid interference with the operational process being monitored such as a non-contact or minimal contact biometric sensor, palm/fingerprint reader and the like located at a sink of a handwashing station. When the user places his/her hands under the water flow while washing his/her hands, the biometric sensor may sense biometric information from the user's hands, arms and gestures, for example. As the user performs the compliance step, the biometric information can be used to determine whether the user is completing the compliance step and also whether the user is completing the compliance step in accordance with the procedure.

Additionally, an embodiment provides feedback to the user while the user is performing the compliance step or after the user has completed the compliance step. For example, if the user stops washing his/her hands before the prescribed length of time for doing such has elapsed, the system may provide an audio or visual signal to the user indicating that the user should continue to wash his/her hands.

In particular circumstances the biometric information can assist the user in completing the task. For example, it may be difficult for a user to visually detect that they have washed all surfaces of a tool or that the surfaces have reached a desired temperature uniformly. An embodiment provides visual feedback by recording video, thermal, chemical, bacterial, or other appropriate imaging while the user performs the compliance step and may then provide visual feedback to the user. Other information gathered during compliance monitoring can also assist the user, such as monitoring use of consumables to ensure that sufficient cleaning product of a suitable kind was used. Thus, as described herein, monitoring performance and completion of compliance steps is enhanced using biometric information.

Now referring to FIG. 1, a user and an operational process being performed by the user is recognized at 101. Operation 101 may involve recognition of the particular user (e.g., "Steve," "Employee 7," etc.), recognition of the category of user (e.g., chef, lab technician, doctor, scientist, etc.), recognition of the location of the user (e.g., user assigned to the kitchen, user assigned to a surgery room, etc.), and the like. User recognition may involve an identification object such as RFID tags, employee badges with visual indicia, wristbands, barcodes, mobile devices of a user, and the like. For example, an employee may have to swipe his/her badge when entering a secure area. To recognize a specific user, the identification objects are associated with the specific user. For example, the user may wear a wristband that transmits a unique code associated with the specific user. Alternatively, the user may only be recognized by category, role or type. For example, the user may be recognized as a food worker, lab assistant, technician or the like through the use of a barcode that is scanned and only identifies the user's role.

An operational process may include a task or series of tasks that need to be performed to complete the operational process. For example, an operational process may include performing an experiment, preparing a meal, performing a medical procedure, and the like. In other words, an operational process may include any process or procedure that requires a user to perform actions or tasks to complete. The operational process may then be broken into different tasks. Using the experiment example above, sample tasks may include donning the proper attire, washing hands, opening a vial containing biological material, adding a substance to the material, closing the vial, and washing hands and equipment with a particular cleaning agent to ensure the biological material is not present outside of its containing vial.

To identify the operational process, an embodiment may access a database or data store having previously stored information. The previously stored information may include information about the user and the operational process that the user is to perform. For example, if the user has been recognized as a chef, the system may identify the operational process(es) associated with being a chef. As another example, if the user is recognized as a lab technician, the system may identify the operational process(es) associated with being a lab technician. If the system recognizes the specific user, the database or data store may include information specific to that user and tasks to be performed by the specific user.

In one embodiment, identification of the operational process may occur or be enhanced at operation 101 through use of an object worn on the body of the user and/or video analytics of the user's actions. As the user moves from one location to another, the object may allow the user's location to be determined. Based upon a previous and current location of the user, an embodiment may determine the operational process that the user is completing. For example, assume that the user is a surgeon who is determined to be walking down a particular hallway of a surgical wing in the hospital. When the system determines that the surgeon has entered a washing station outside a surgical room (e.g., via the surgeon swiping his/her badge at the washing station door), the system may imply that the surgeon is likely going to be performing a surgery.

The identification of the operational process may be enhanced using additional information which may be accessible to or by the system. Using the example of the surgeon, the system may access the calendar of the surgeon and use the calendar to confirm that the surgeon is scheduled for a surgery. Other information may be accessed or used by the system, for example, location maps, communication messages (i.e., phone calls, emails, text messages, social media posts, etc.), user schedules, location schedules (e.g., experiments or processes being conducted at a location, access times, employee schedules at that location, etc.), badge or other identification object information, and the like.

At operation 102 an embodiment may ascertain a task of the operational process that is to be performed by the user. The tasks of the operational process may be identified in a manner similar to those in connection with identifying the operational process. For example, a wearable device and/or video analytics systems allow the system to locate the user near a prepping station in a kitchen. Since the system has already determined that the user is performing the operational process of preparing a meal containing chicken, the system may ascertain that the user is about to perform the task of preparing the vegetables for the meal. The system may track the user's location over time in the preparation area such that even though the operational process includes multiple tasks that require use of the prepping station, the system knows that the user has previously accessed the prepping station two times and when the user accesses the prepping station for the third time, the user is performing the task of preparing the vegetables. In other words, ascertaining the task may include inferences and additional monitoring by the system.

Based on the identified task to be performed the system may identify a compliance step to be performed before starting and/or before completion of the identified task at 103. Unlike static written procedures, real time monitoring enables tasks to be dynamically identified in operation 103 based on emerging events that are sensed during the operation. As an example, if a surgeon leaves the surgical room during a surgery, before reentering the surgical room, the surgeon may be required to rewash his/her hands. However, the static written procedure for the surgery may not include that particular compliance step, because the procedure for the surgery was written assuming that the surgeon would not leave the room during a surgery. Thus, identification of the compliance step in 103 may be based upon a different policy or procedure that is dynamically determined. For example, a company may have a policy that states anytime a user leaves a food prepping area, the user has to wash his/her hands before re-entering the food prepping area or that when a knife is sharpened mid-procedure it must be sterilized before use.

The system may then determine, at 104, whether the user has satisfactorily completed the compliance step. This determination may include evaluating biometric data associated with the user, environmental sensors, timers and the like. Examples of biometric data may include fingerprints, retina scans, DNA, facial recognition, photographic/video images, and the like, that are capable of acquiring unique recognition of a user within the context of the procedure being monitored. As an example, a fingerprint sensor may be located at a sink in a handwashing station. The system may collect more than one type of biometric data. For example, a handwashing station may be equipped with both a fingerprint sensor and gesture recognition device such as a video image sensor. The fingerprint sensor may be used to identify the user who is performing the step and the image sensor may be used to determine if the user complied with all the requirements of the compliance step.

To determine whether a user has complied with the compliance step, an embodiment may match the obtained biometric and environmental data with a database or data store containing conditions to be satisfied. For example, the system may compare the biometric data obtained using the fingerprint sensor located at the soap dispenser to a database to match the user stored information and recognize which user is completing the compliance step. The system may then identify whether the operational process required the user to perform the compliance step. If the operational process included the compliance step, the system may note that the user performed the compliance step.

The compliance step performance may be evaluated against established criteria such as time, temperature, cleaning agents, and the like, that would be required for a particular compliance task. The compliance step may have different requirements or operations associated with it. For example, the compliance step may require that the user perform the step for a predetermined length of time, that the user uses a particular object or consumable during completion of the compliance step, that the user perform different operations during completion of the compliance step, and the like. For example, the compliance step may require that the user wash his/her hands for a prescribed length of time. As another example, the compliance step may require that the user use a particular type of soap or other consumable to kill particular kinds of bacteria. As another example, the compliance step may require that the user scrubs his/her hands with a particular device and thoroughly washes both sides of his/her hands. Determining compliance with all the requirements may be completed using similar methods as determining compliance with the compliance step. For example, each of the objects and/or consumables that a user has to use to comply with the requirements of the compliance step may have biometric sensors. As another example, images may capture, and video analytics may be used of, the user during completion of the compliance step to identify whether the user has complied with the requirements of the compliance step.

When the system determines that the user has complied with the compliance step at 104, an embodiment may allow the user to progress to the next step of the operational process at 105. If, however, the system determines that the user has not complied with the compliance step at 104, an embodiment may provide feedback to the user at 106. For example, the system may notify the user that they have not completed all requirements of the compliance step. As an example, the system may provide an audio notification (e.g., voice, buzzer, beep, etc.) that indicates the user has not completed all operations of the compliance step. As another example, the user may provide a visual notification (e.g., blinking light, video, pop-up display, etc.) that indicates the user has not completed all the operations of the compliance step. Although not illustrated, feedback operation 106 may also be included together with operation 105 to provide positive indication of compliance.

If the user has partially complied with requirements of the compliance step, but not all the operations of the compliance step, the feedback may be based upon the user's degree of compliance with the compliance step. As an example, if the compliance step requires the user to wash his/her hands for sixty seconds, but the user only washes his/her hands for forty-five seconds, the feedback may include notifying the user that he/she needs to wash his/her hands for an additional fifteen seconds.

Feedback may occur during completion of the compliance step, as per the example above, or may additionally, or alternatively, occur after completion of the compliance step. For example, an embodiment may capture images of the user completing the compliance step. Additionally, the images may be analyzed, edited and additional feedback may be provided with the images. For example, the system may compare the video of the user completing the compliance step with an exemplary video of how the compliance step should be completed. The system may identify differences between the two videos and augment the video (e.g., making marks on a video frame, adding audio commentary to the video, etc.) with the necessary feedback.

Feedback may also include preventing the user from progressing to the next step of the operational process. For example, if the system determines that a lab technician has failed to comply with a compliance step of disposing of lab gear that may have been contaminated or damaged, the system may prevent the user from leaving the secure area by preventing operation of the door. The system may also provide feedback on why the user cannot progress to the next step. As another example, if a surgeon has not complied with all the requirements for washing his/her hands before performing a surgery, the surgeon may be unable to enter the surgical room. As another example, if the system has identified that a chef has not washed his/her hands, the system may prevent access to food items.

Although discussed in the context that the user has not complied with all the operations of the compliance step, it should be understood that feedback may also be provided if the user has complied with all operations of the compliance step. For example, the system may provide feedback to the user that they have complied with all the requirements of the compliance step. Additionally, feedback may be provided even if the system has not made a determination of whether the user complied with the operations of the compliance step. For example, the system may not determine if the user has complied with the requirements of the compliance steps while the user is performing the operational process. Rather, the determination of compliance may be determined at a later time, for example, after review of video documentation. However, feedback may still be provided while the user is performing a compliance step. For example, if the user is to wash his/her hands for a prescribed length of time, the system may provide a buzzer when the prescribed length of time has elapsed. However, the system may not determine if the user used the correct soap until a later time.

Figure 2:
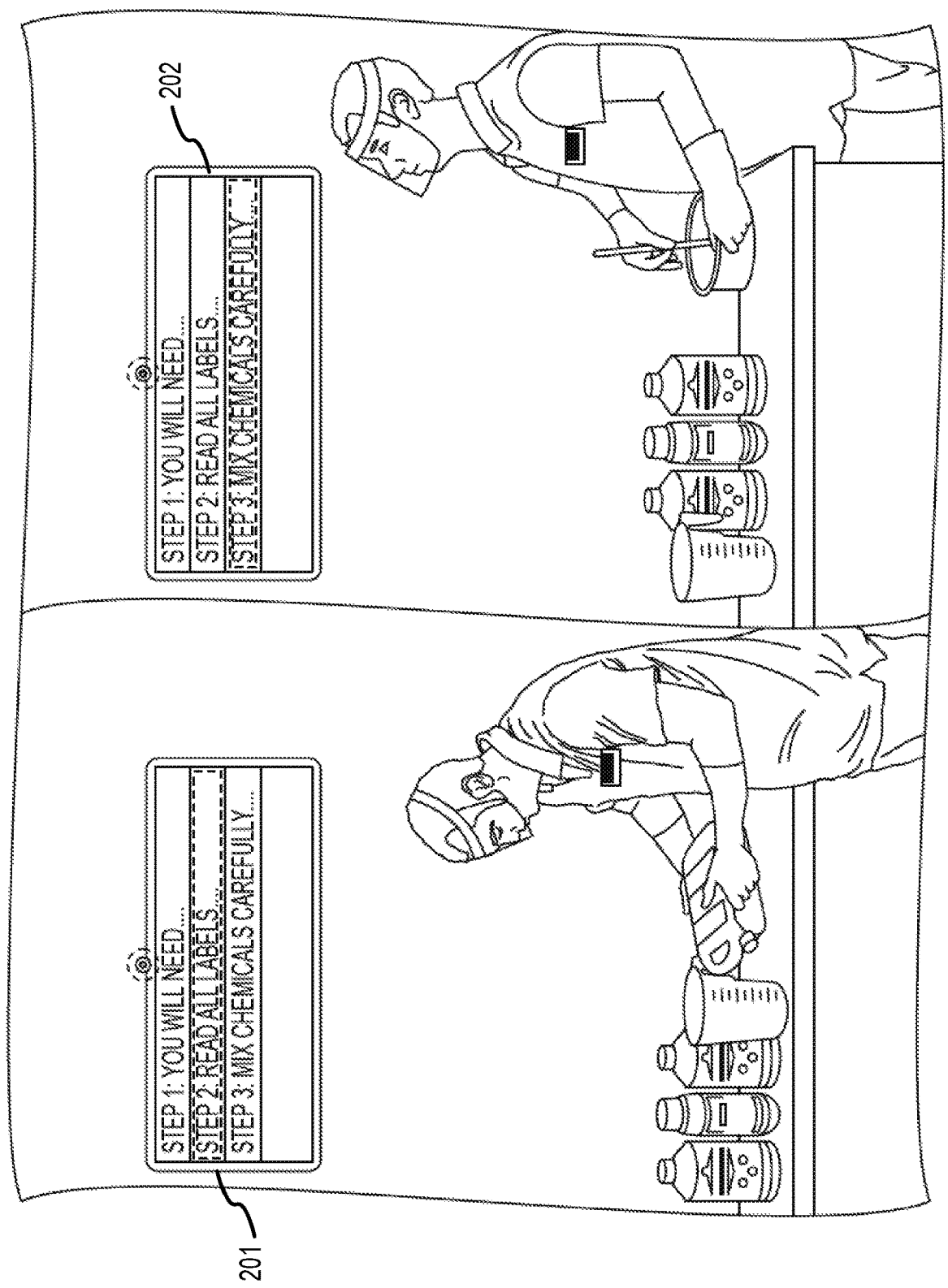
FIG. 2 illustrates an example of providing feedback to a user based upon compliance with a step in an operational process.

FIG. 2 illustrates an example of additional feedback that may be provided by the system. As the system determines the user has complied with a step 201, the system may update an instruction board, verbal instruction recording, and the like, to the next step in the process as shown at 202. Thus, the system may provide feedback in allowing or prompting the user to proceed to the next step in the procedure.

Certain embodiments are specifically useful in operating commercial kitchens and food preparation areas. A problem with state of the art techniques that use electronic transmitters and receivers (e.g., radio frequency identification (RFID) tags, near field communication devices, etc.) to determine if a user or employee has been near a location related to a procedure, e.g., is present at a handwashing station, is that these techniques only recognize whether the user is close to a location required for compliance. These techniques do not recognize whether the user actually completed the handwashing procedure. A handwashing procedure may include a user washing his/her hands or another procedure that requires a user to wash something by hand (e.g., washing food products, washing dishes, washing utensils, washing cutting boards, washing medical equipment, washing dental equipment, washing laboratory equipment, washing food processing equipment, washing parts, etc.). For example, using an RFID tag cannot identify that the employee actually washed his/her hands using the appropriate soap or hand sanitizer, for a preferred amount of time, and the like. Moreover, wearable devices can themselves lead to contamination in some working environments as the surfaces of the device may carry contaminants.

Figure 3:
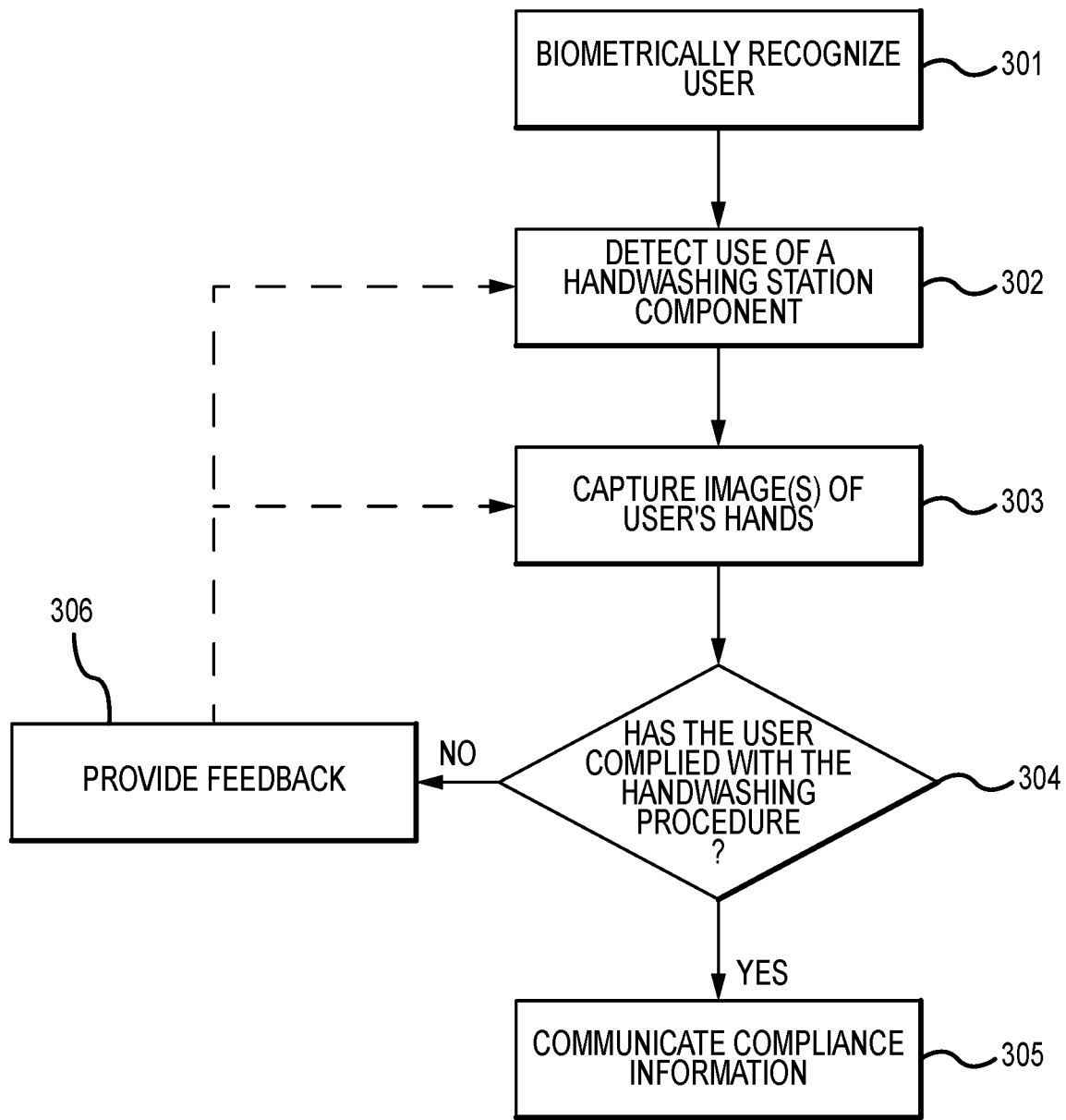
FIG. 3 illustrates an example system implementing a specific instance of the method of FIG. 1 for monitoring a user performing a handwashing procedure.

Accordingly, as a more specific example for monitoring if user complied with an operational step, an embodiment provides a method for monitoring a user performing a handwashing procedure and evaluating the user's compliance with predetermined steps required by the handwashing procedure. Referring now to FIG. 3, at 301, an embodiment recognizes a user, for example, as explained in connection with 101 of FIG. 1, e.g., using biometric data such as fingerprint data, image data, clothing recognition, and the like, without the need to employ a device such as an identification badge having an RFID device therein. It is worth noting that different users may have to perform different handwashing procedures. Thus, an embodiment chooses a particular handwashing procedure or protocol dependent upon the user that is biometrically recognized.

At 302 and 303 an embodiment also determines if specific tasks necessary for compliance with a handwashing procedure have been performed by the user, for example, using similar techniques as described in connection with 104 of FIG. 1. The system may determine if the specific tasks have been performed by evaluating data captured during the handwashing procedure, e.g., image data from an image sensor directed at the user's hands is employed by an embodiment to capture images of the user's hands as he or she performs the handwashing procedure for comparison against expected image data, for example at 303. This permits an analysis, e.g., by comparison of image analysis data of the user's hands in the images with expected data that conforms to handwashing procedure compliance.

Additionally, at 302, an embodiment also provides a determination if certain components, e.g., a water faucet, a liquid hand sanitizer, cleaning product dispenser, etc., have been used at appropriate times or for an appropriate duration by the user during the handwashing procedure. In an embodiment, this data is combined with image analysis data to ensure compliance with a predetermined handwashing procedure.

At 304, an embodiment determines if the user complied with the handwashing procedure. Compliance with the handwashing procedure can be determined using techniques as described in connection with 104 of FIG. 1. For example, an embodiment determines, e.g., via an image analysis algorithm that compares the image data of the user's hands to an expected pattern of movement for a given handwashing procedure, if the user has complied with a predetermined handwashing procedure at 304. As described herein, the determination made at 304 may take into account other data, e.g., the user's operation of a component of the handwashing station, the order in which components of the handwashing station are utilized, the duration of time that the components are utilized, etc. The type of monitoring data that is used to make the determination at 304 is influenced by the handwashing procedure used for comparison.

Additionally, an embodiment provides feedback to the user at 305 and 306, e.g., while the user is performing the handwashing procedure or after the user has completed the handwashing procedure. For example, if the user stops washing his/her hands before the prescribed length of time has elapsed, the system provides audio or visual output to the user indicating that the user should continue to wash his or her hands, for example at 306.

An embodiment also provides feedback in the form of compliance data at 305. For example, an embodiment provides compliance data to another user, e.g., to a mobile device of a manager or a supervisor, to a remote database, etc., such that another user is aware that handwashing procedures are being complied with. An advantage of this feature is that the remote database maintains an auditable record of compliance that can be used for training, issue investigation and other purposes. An embodiment provides anonymous compliance data, e.g., as a statistic of overall compliance for a period (e.g., percentage of employee handwashing compliance per day, week, month, etc.). An embodiment may provide anonymous compliance data in the form of numerical data, image data, or video data.

If the user has not complied with the handwashing procedure, as determined at 304, an embodiment may offer feedback, e.g., a corrective instruction, as indicated at 306. This may require the user to re-perform certain steps in the handwashing procedure prior to being given an indication that compliance has been achieved, as indicated by the dashed arrows in FIG. 3. An embodiment includes feedback data in the communication of the compliance information, e.g., noting that a user had to re-perform a particular step in the handwashing procedure.

The illustrated example embodiments will be best understood by reference to the figures. The following description is intended only by way of example, and simply illustrates certain example embodiments.

Figure 4:
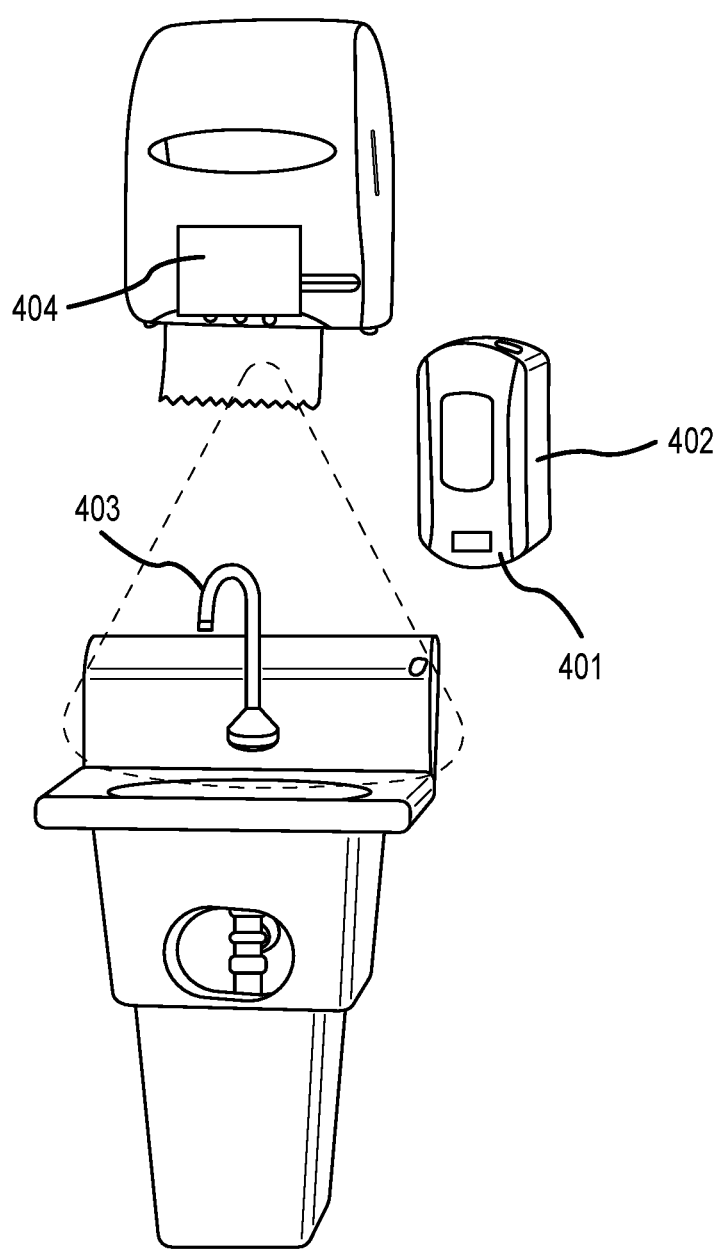
FIG. 4 illustrates an example of monitoring a user for compliance with a handwashing procedure.

As illustrated in FIG. 4, a system according to an embodiment includes a biometric sensor 401. The biometric sensor 401 captures data (e.g., fingerprint data, anterior/posterior hand data, subsurface vein pattern, etc.) and permits recognition of a user that is proximate to or touching a system component, here a liquid soap dispenser 402. A biometric sensor 401 collects biometric information prior to operating a handwashing station component (e.g., water faucet 403, soap dispenser 402, etc.). This permits positive user recognition without the need for the user to carry or wear another device (e.g., RFID bracelet or badge).

After a user is recognized, an embodiment monitors the user's operation of the handwashing station components to ensure compliance with a predetermined handwashing procedure or protocol. For example, an embodiment collects monitoring data for comparison to expected data of a preferred, predetermined handwashing procedure. The handwashing procedure may be selected based on the biometric identification of the users, i.e., different users may be required to comply with different handwashing procedures.

The comparison of the monitoring data with a predetermined handwashing protocol may be simple or more complex. By way of example, an embodiment detects if a soap dispenser 402 and a water faucet 403 are utilized, in which order, and for how long and compares this data against an pre-established series of events.

The monitoring data may be collected in a variety of ways. For example, sensors may be disposed within the soap dispenser 402 and water faucet 403 in order to detect their use and the duration thereof. As another example, if an electronically activated soap dispenser 402 or water faucet 403 are employed, the activation signals may be counted to collect monitoring data.

An embodiment includes an image sensor 404 that is positioned to view the user's hands while they perform the handwashing procedure. In FIG. 4, the field of the image sensor's view is indicated generally with a dashed line. In one embodiment, the image sensor 404 is a video image sensor. Image data from the image sensor 404 is provided to a processor that executes a program to compare the image data from the image sensor 404 to expected image data of a preferred handwashing technique. In an embodiment, the expected data includes simply detecting periodic movement of the user's hands in the image data for an established amount of time. In another embodiment an image analysis algorithm may compute how many times and/or how often a user places one hand on top of the other in the image data collected from the image sensor 404. In an embodiment, the image analysis algorithm computes how often or for what duration the user contacts the water from the water faucet 403.

The image analysis performed by an embodiment is combined with other data such as water temperature, water flow rate and the like to evaluate compliance with a preferred handwashing procedure. For example, a processor executes a program of instructions that calculates a compliance score on the basis of the image analysis, the use of required components (e.g., soap dispenser 402, water faucet 403, etc.), the order of usage, the duration of usage, etc. The compliance score indicates whether a user has exceeded one or more predetermined compliance threshold(s). As another example, the compliance score indicates which, if any, part of the handwashing procedure was not complied with. In an embodiment, the compliance score is communicated to another device, e.g., to a remote database, to a mobile computing device, etc.

An embodiment provides feedback to the user, e.g., during the handwashing procedure. For example, a visual indicator (e.g., a display screen, LEDs, etc.) is included in an embodiment to display an indication that a correct handwashing technique is or is not being performed by the user. In an embodiment, in response to detecting that a user has not followed a preferred handwashing technique, an instructive display is given, e.g., a video demonstrating correct handwashing technique. The feedback is provided by an embodiment in one or more forms, e.g., audio feedback, visual feedback, communication of a compliance score, etc.

Figure 5:
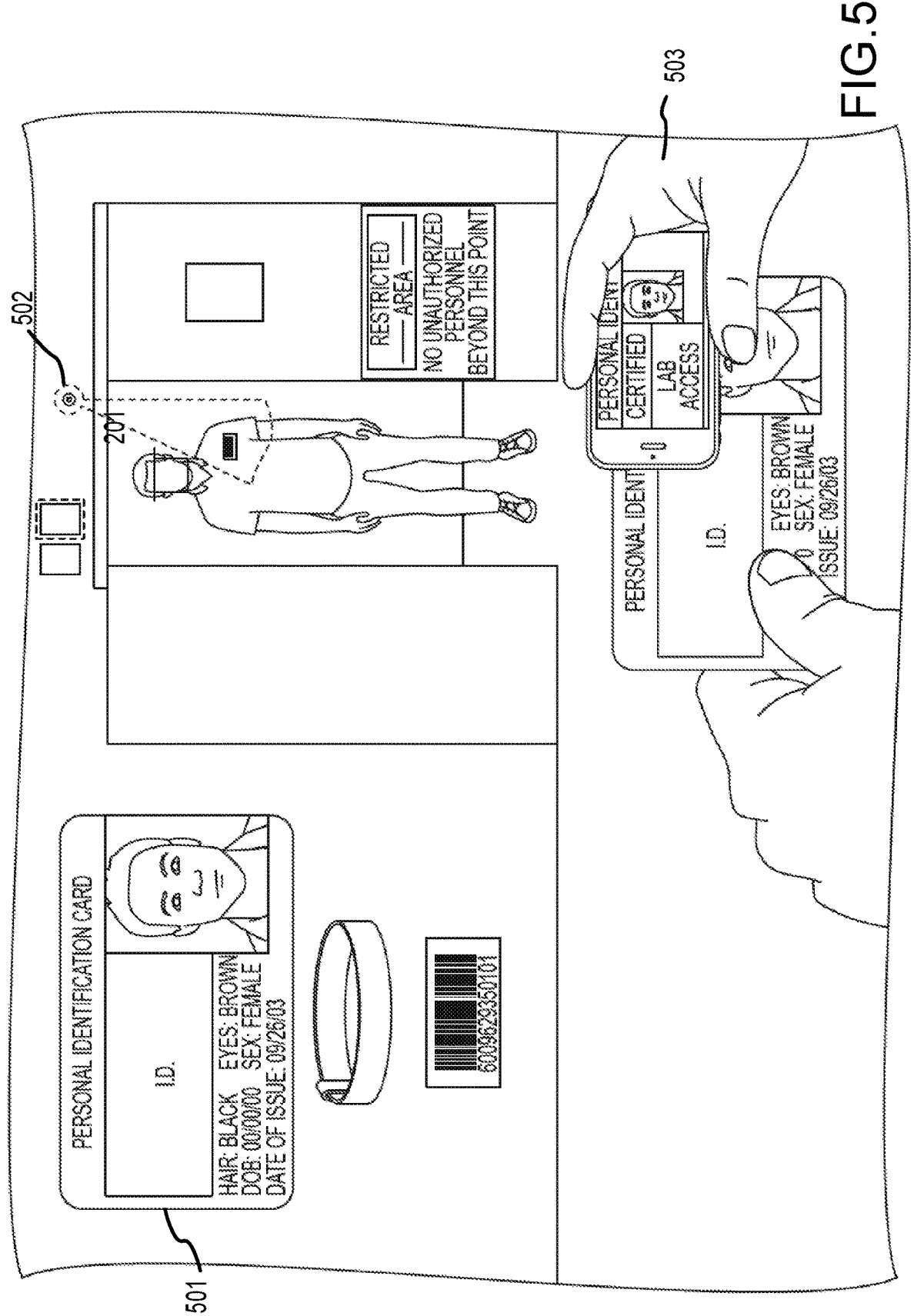
FIG. 5 illustrates an example of allowing a user into a restricted area based upon compliance with access procedures.

As another example of monitoring a user performing an operational process and with reference to FIG. 5, the system as described herein can be used to determine if a user has access to a restricted area 502. Using an identification object 501 (e.g., employee badge, barcode, identification bracelet, etc.), the system can recognize the user 503. Upon the user 503 entering a restricted area 502, the system may scan the identification object 501 and determine if the user 503 is allowed to access the restricted area 502. Whether the user 503 may enter the restricted area 502 may be included in a database and associated with the identification object 501.

With regard to these handwashing check use cases, it can be seen that the monitoring of procedure compliance can be used in settings where an employee must meet handwashing requirements before gaining access to a controlled area. The system and method for monitoring hand washing may: (a) may automate what previously was manual critical process monitoring and control; (b) may use video biometric sensors (e.g., part of the video analytic tool) to monitor that the right person at the right time is attempting to access an area and that the person completed the right technique of handwashing and was given correct real-time feedback, which allows them to do the rest of their task; and (c) may support seamless switching between multiple personnel identifiers (e.g., a badge, a wristband, a bar code, a visual identifier, and so on).

Such a handwashing use case may involve a combination of training verification and status verification. The training verification may involve the system verifying: (a) person attempting access has training (e.g., employee identifier is scanned and handwashing training and procedures for controlled access are called up); (b) once the person is trained or training is verified, the data of the system is updated; (c) the system pulls up or retrieves relevant documentation for the identified person; and (d) the system may provide the person with information pertaining to field site specific training. The status verification may involve the system verifying: (a) whether person meets criteria to gain access; (b) if access was not granted, whether training was sent to the person denied access; (c) whether management of the controlled area and/or the employee was notified if access denied; and (d) whether data was collected to improve the access and/or training process. As can be seen, the system knows who each employee or person is that is attempting to access a controlled area. The system also knows what requirements are required for performing handwashing prior to being allowed access. The system is configured to send training information to the employee if requirements are not met, and these requirements must be met before the system will allow access to the controlled area.

As will be understood from the above description, the new system and methods are particularly well suited for providing critical process verification in many settings. The systems, in some cases, use machine learning to analyze video footage captured by one, two, or more video cameras (labeled image sensors and video image sensors in the prior discussion). Beyond video footage analysis to confirm compliance with requirements for performing a compliance step such as with an image analysis algorithm, the system (and methods) provide real-time feedback before, during, and after a person(s) performs a process based on the video footage analysis. Often, the feedback will involve the system indicating that the compliance step was not performed properly, and the task or operation for which this compliance step was a precursor will be stopped and the user instructed via the feedback to reperform one or more compliance steps or tasks (or the whole critical process) before proceeding. In short, the systems and methods validate human behaviors and/or a sequence of events performed by or involving a human actor through video footage analysis so as to avoid having a second person watching or performing the verification (in some cases).

The following discussion provides a further discussion of a system for implementing the described methods (e.g., for use in carrying out the methods of FIGS. 1-3 (and figures described below) and for practicing the systems of FIGS. 4 and 5. The discussion then provides more detailed description of other use cases for the new system and method to stress that the description is not limited to verifying handwashing but is, instead, useful in wide ranging applications and environments.

Figure 6:
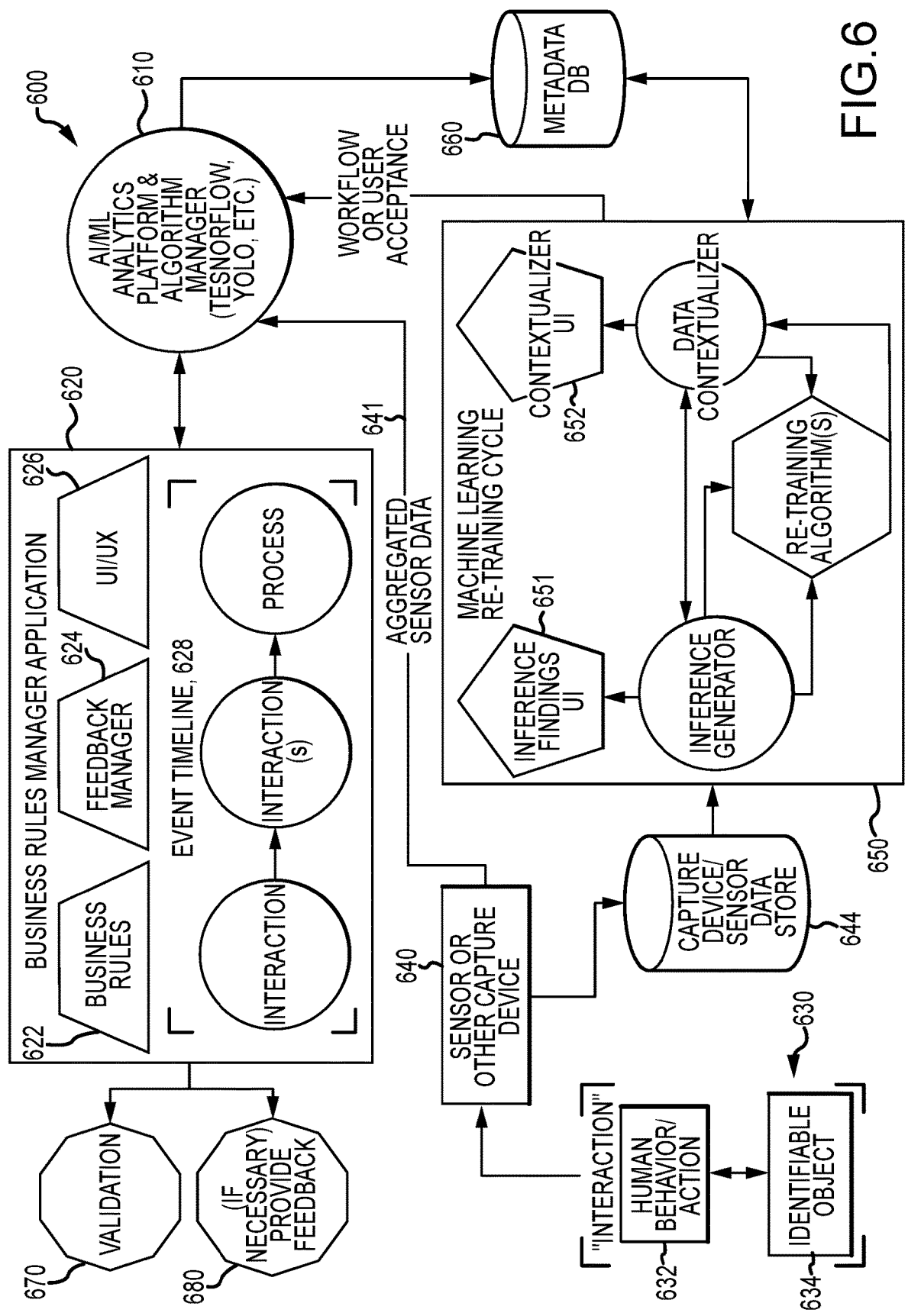
FIG. 6 is a functional block diagram of a system for monitoring procedure compliance.

FIG. 6 provides a functional block diagram of a system 600 useful for monitoring procedure compliance. As shown, the system 600 includes an AI/ML analytics platform 610 that may take the form of a computer or computer system with a processor(s) running or executing code to provide the functionality of the video image processing analytics algorithm and for performing the steps or functions of the methods taught herein. The platform 610, in this regard, may run a business rules manager application 620 with modules/routines for providing or implementing business rules 622, a feedback manager 624, and a user interface 626, and monitoring of procedure compliance is performed in part by the application 620 by a defined event timeline for the compliance step(s). The output of the application 620 may be validation 670 that a monitored operator or human actor performed a compliance step and/or feedback 680 (e.g., that step was performed correctly or that it was not and should be performed again (sometimes with guidance on how to better comply with step requirements)).

With regard to application 620, all updates to the algorithm in platform 610 are validated by a user or automated work flow process. Business rules 622 read the event timeline 628 to provide validation or feedback. The feedback manager 624 defines rules for feedback and how/when such feedback is provided. The event timeline 628 controls which algorithms or object detections happen based on interactions. When all steps in the timeline 628 are successfully completed in the interaction 630, validation 670 is provided; otherwise, the feedback manager 624 is triggered.

A sensor(s) 640, which may include one or more video cameras, is used to sense data pertaining to an interaction 630, and this data is stored in a datastore/memory 644. The interaction 630 may involve actions or behaviors 632 of a human actor (e.g., a worker or technician being monitored by the system 600) as well as their use, movement, and/or operation of an identifiable object 634 during the behavior or action 632. A database 660 of metadata pertaining to performance of monitoring procedure compliance during operation of the system 600 is updated on an ongoing basis by the platform 610. A machine learning re-training cycle application 650 may process the metadata in database 660 along with the sensed data 644 and, in response, generate workflow or user acceptance that is passed to the platform 610. A finding UI 651 is provided to allow users to decide if new findings should be evaluated as part of the platform 610, and a contextualizer UI 652 is provided to allow users to specify additional context to data or to validate new context findings.

The procedure compliance monitoring process performed by system 600 may be summarized as: (1) a human does something 632 with an object 634 that creates an interaction 630; (2) the interaction 630 is captured by one or more sensors 640; (3) the sensor 640 feeds data (as shown with arrow 641) into an algorithm on platform 610 that determines what the interaction is; (4) business logic 622 and a timeline of events 628 is overlaid on this monitored interaction; and (5) the series of actions that was completed is validated 670 and/or feedback is provided of validation or non-validation by the feedback manager 624 such as via GUI 626.

The following provides a description of eleven use cases (beyond the handwashing monitoring discussed above) in which monitoring procedure compliance may be carried out using the new method (e.g., using video analytics) such as by implementations of the system 600 of FIG. 6. From these use cases, many other uses for the invention will be apparent to those in the industry. For example, the new monitoring process may be used in the maritime space as follows: (1) in muster areas (e.g., monitoring whether crew members show example of putting on life vest to passengers during a drill or another compliance step); (2) in mechanical spaces such as docking lines/ropes areas (e.g., did crew members remain clear of the mechanical envelope or perform another compliance step); and (3) in bridge or Engine Control Room (ECR) (e.g., while underway, monitoring a compliance step such as whether people are in positions and monitoring/scanning informational devices (e.g., gauges, screens, and so on)).

As a brief overview, the eleven use cases are: (1) ride restraint check for a track/land-based ride, which involves system observing ride vehicle safety and restraint checks (e.g., system operates to monitor employees and passengers to identify risks); (2) ride restraint check for a boat ride, which involves system observing boat safety and restraint checks (e.g., system operates to monitor employees and passengers to identify risks); (3) chair lift boarding check for ski hill, which involves system monitoring safety and sending safety communications (e.g., system can alert lift riders and ski patrol and can stop the ski lift when danger is determined potentially present based on monitoring of procedure compliance); (4) cleaning processes check, which may involve monitoring cleaning processes for an operating table (e.g., system can operate to verify that the correct procedures are followed so the entire operating table (or other surface/object) is cleaned thoroughly); (5) food safety check, which may involve monitoring food preparation/handling personnel performing processes for avoiding cross contamination (e.g., system can observe that the correct cleaning and food safety procedures are followed); (6) mixing pesticides check (e.g., system may observe and provide check points and control steps); (7) bolt torque check (e.g., system may observe work while it is being performed in order to verify bolt tightening is perform correctly and safely); (8) controlled environment check, which may involve monitoring a park ride or similar mechanical system when in motion or operating (e.g., system may observe and verify if an area is safe to enter and can send alerts when the ride/mechanical system is in motion/operating and area has been entered without authorization); (9) monitoring check, which may be used to provide procedure compliance by safety and/or security personnel (e.g., system can observe and detect when monitoring screens or equipment is not being monitored properly by personnel); (10) driver check for transportation industry (e.g., system can observe and detect when drivers of vehicles are distracted); and (11) clean room check for manufacturing industry (e.g., system can observe and provide check points and control steps).

Figure 7:
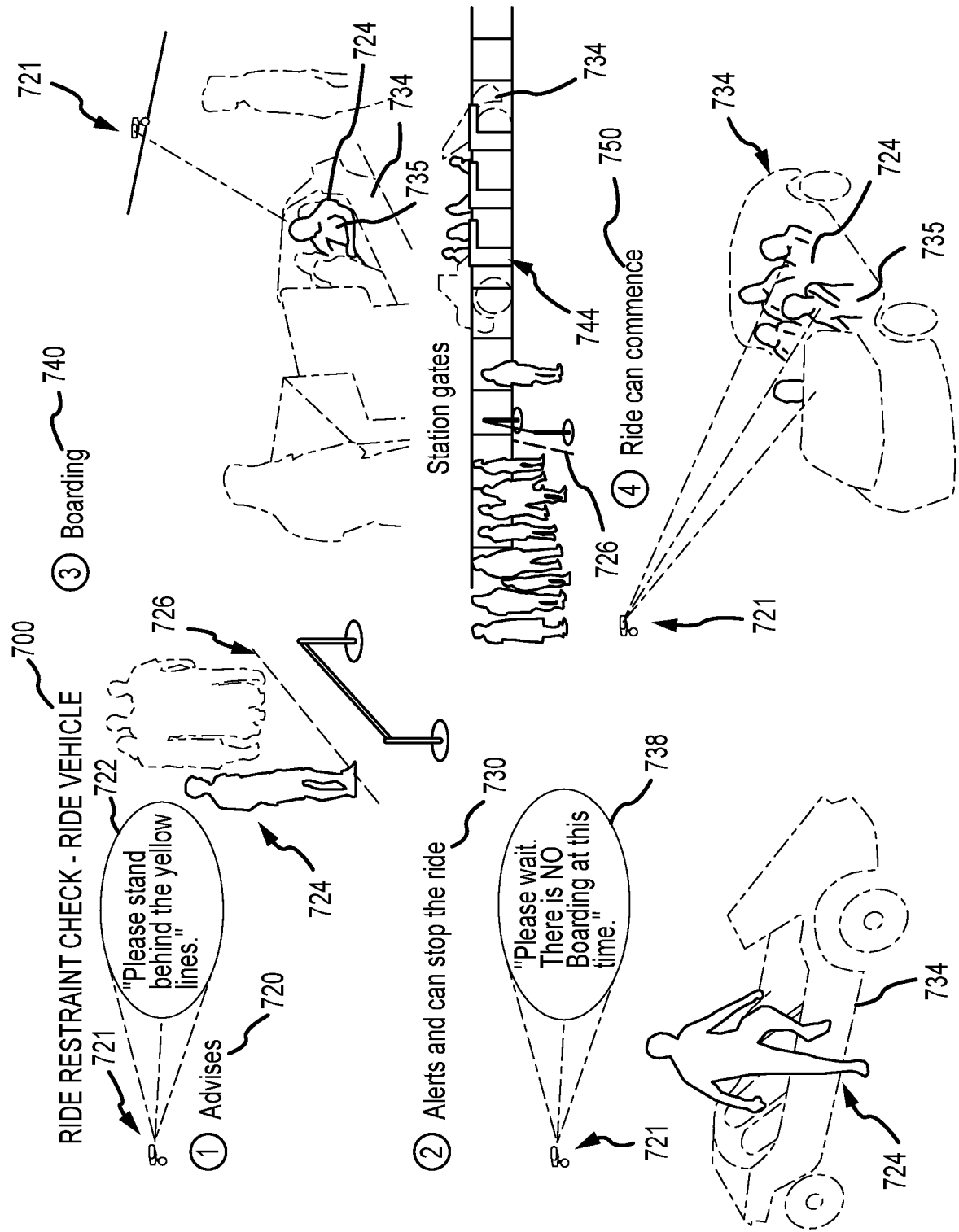
FIG. 7 illustrates four stages or operating modes/states of a system performing a procedure compliance monitoring operation for a ride restraint and safety check for a ride vehicle.

With regard to the first listed use case, FIG. 7 illustrates four stages or operating modes/states 720, 730, 740, 750 of a system 721 performing a procedure compliance monitoring operation or method 700 for a ride restraint check for a ride vehicle 734. In FIG. 7, a video camera is shown as representing the system or video analytic tool 721, but it will be understood from FIG. 6 and other portions of the description that the system 721 includes all the components useful for carrying out the functions taught herein including a computer running a video analytics algorithm, data stores storing compliance step requirements, business application software and software for a machine learning re-training cycle, and hardware (e.g., an audio system for providing audio feedback, a visual display system for providing visual feedback, and the like). This understanding of the additional features of the compliance monitoring system 721 is also applicable to later figures.

In a first stage or operating mode/state 720, the system 721 is operable to monitor employee processes and passenger positions relative to safety components or markers. Feedback 722 in the form of an audio announcement (e.g., "Please stand behind the yellow lines.") may be provided in response to the monitoring operations (e.g., video analysis compared to safety or process requirements). First stage 720 may be considered an advising operating mode that involves: (a) the system evaluating each employees' processes to maintain safe operations of vehicle-based ride; (b) the system monitoring crowd safety and sending alerts including alert/feedback 722; (c) the system sending alerts to employees and/or supervisors; and (d) the system tracking and monitoring positions of employees and passengers in the loading/unloading space. As shown, the system 721 may sense the locations/positions of passengers 724 relative to safety markers or equipment 726 (shown as a dashed line that passengers should be behind while a ride is operating or prior to loading times).

In a second stage or operating mode/state 730, the system 721 may continue to monitor compliance of employees and/or passengers with compliance steps. If a compliance step is not validated as being followed, the system 721 may provide feedback that causes the ride to stop operations (or may even be coupled to the ride control system to automatically perform this function). For example, the video analytics algorithm running in the system 721 may process captured video data of the loading/unloading space and determine that a passenger 724 is attempting to load a vehicle 734 prior to loading being allowed for the ride (or of crossing the safety line/marker 726). The ride may be stopped and/or other feedback 738 may be provided (e.g., visual indicators of noncompliance with a compliance step or audio feedback of detected noncompliance (e.g., "Please wait. There is no boarding at this time.")).

In a third state or operating mode/state 740, the system 721 continues to monitor passenger and employee actions to determine whether a set of compliance steps are being properly performed during the vehicle boarding process. For example, video analytics is used to determine that a passenger 724 has entered a vehicle 734 and to then determine if the compliance step of checking seat belts are properly fastened has been performed by an employee. Further, the system 721 may operate to determine that toward the end of boarding that: (a) all passengers (for a next ride) 724 are behind a safety marker 726 (a painted line or rope/chain); (b) station gates 744 are closed or in a predefined configuration; and (c) all passengers (for the present ride) 724 are safely boarded in a vehicle 734.

In a fourth state or operating mode/state 750, the system 721 may validate that all safety processes (i.e., all compliance steps) have been verified or validated as having been completed according to a predefined set of requirements, and the ride may be allowed by the system 721 to commence (e.g., allow the ride vehicle 734 to begin traveling on a track or the like). The commencement of the ride (a next operation) may be blocked or prevented by the system 721 until compliance steps are verified/validated, and feedback may be provided to the employees (or passengers) to encourage completion of any compliance steps (or substeps of such steps) as needed and as discussed above with regard to FIG. 6 and the handwashing exemplary use cases.

Figure 8:
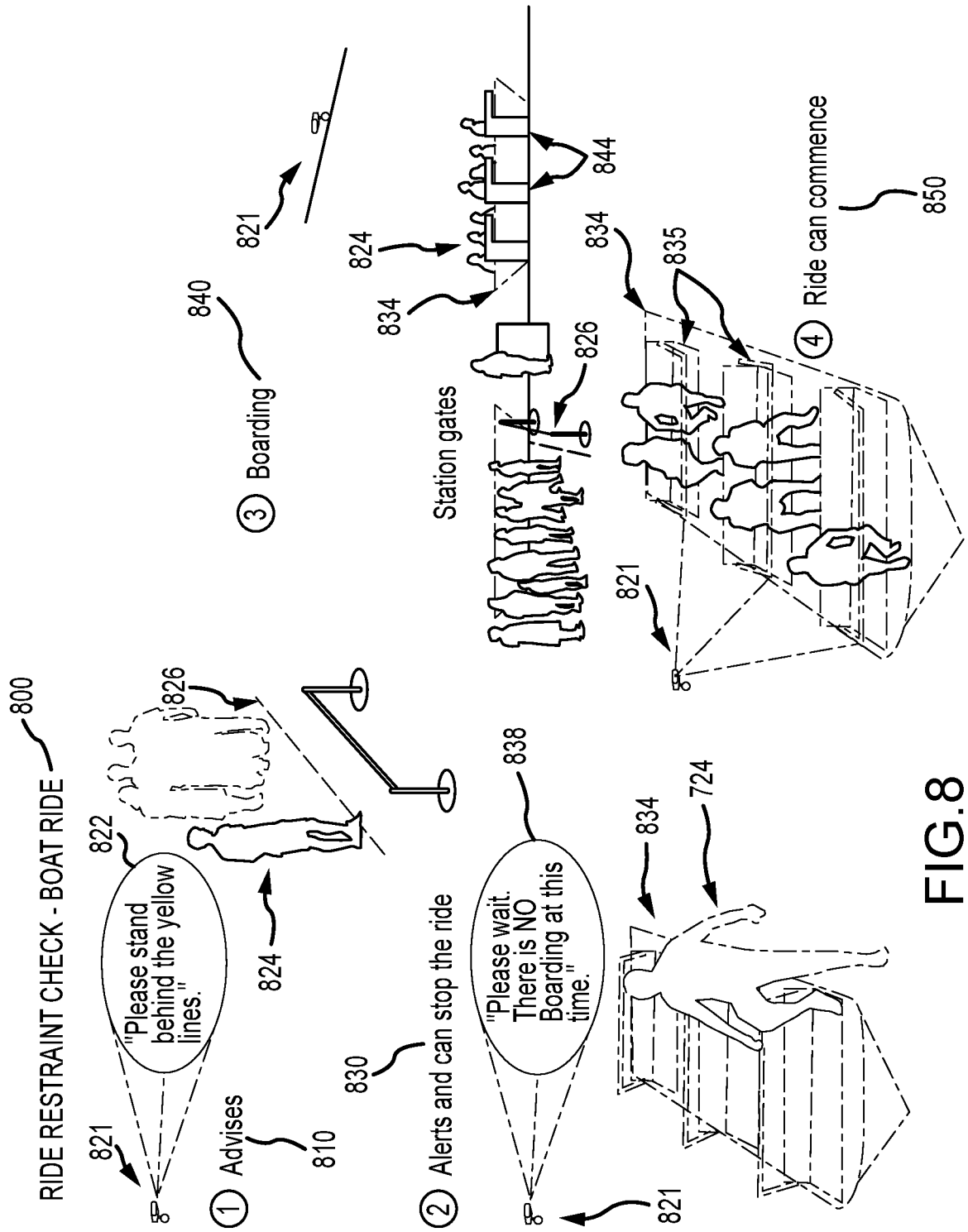
FIG. 8 illustrates four stages or operating modes of a system performing a procedure compliance monitoring operation for a ride restraint and safety check for a water ride.

With regard to the second listed use case, FIG. 8 illustrates four stages or operating modes/states 820, 830, 840, 850 of a system 821 performing a procedure compliance monitoring operation or method 800 for a ride restraint check for a water ride vehicle or boat 834. In a first stage or operating mode/state 820, the system 821 is operable to monitor employee processes and passenger positions relative to safety components or markers 826. Feedback 822 in the form of an audio announcement (e.g., "Please stand behind the yellow lines.") may be provided in response to the monitoring operations (e.g., video analysis compared to safety or process requirements). First stage 820 may be considered an advising operating mode that involves: (a) the system evaluating each employees' processes to maintain safe operations of boat or other water vehicle-based ride; (b) the system monitoring crowd safety and sending alerts including alert/feedback 822; (c) the system sending alerts to employees and/or supervisors; and (d) the system tracking and monitoring positions of employees and passengers in the loading/unloading space. As shown, the system 821 may sense the locations/positions of passengers 824 relative to safety markers or equipment 826 (shown as a dashed line that passengers 824 should be behind while a ride is operating or prior to loading times).

In a second stage or operating mode/state 830, the system 821 may continue to monitor compliance of employees and/or passengers with compliance steps. If a compliance step is not validated as being followed, the system 821 may provide feedback that causes the ride to stop operations (or may even be coupled to the ride control system to automatically perform this function). For example, the video analytics algorithm running in the system 821 may process captured video data of the loading/unloading space and determine that a passenger 824 is attempting to load a boat 834 prior to loading being allowed for the ride (or of crossing the safety line/marker 826). The ride may be stopped and/or other feedback 838 may be provided (e.g., visual indicators of noncompliance with a compliance step or audio feedback of detected noncompliance (e.g., "Please wait. There is no boarding at this time.")).

In a third state or operating mode/state 840, the system 821 continues to monitor passenger and employee actions to determine whether a set of compliance steps are being properly performed during the boat boarding process. For example, video analytics is used to determine that a passenger 824 has entered a vehicle 834. Further, the system 821 may operate (again through processing sensor data) to determine that toward the end of boarding that: (a) all passengers (for a next ride) 824 are behind a safety marker 826 (a painted line or rope/chain); (b) station gates 844 are closed or in a predefined configuration; and (c) all passengers (for the present ride) 924 are safely boarded in a boat 834.

In a fourth state or operating mode/state 850, the system 821 may validate that all safety processes (i.e., all compliance steps) have been verified or validated as having been completed according to a predefined set of requirements, and this may include determining through video analytics and/or other processes that all lap bars have been lowered and checked by an employee as down and/or locked in that position. The ride may be allowed by the system 821 to commence (e.g., allow the boat 834 to begin traveling in along a water channel). The commencement of the ride (a next operation) may be blocked or prevented by the system 821 until compliance steps are verified/validated, and feedback may be provided to the employees (or passengers) to encourage completion of any compliance steps (or substeps of such steps) as needed.

Figure 9:
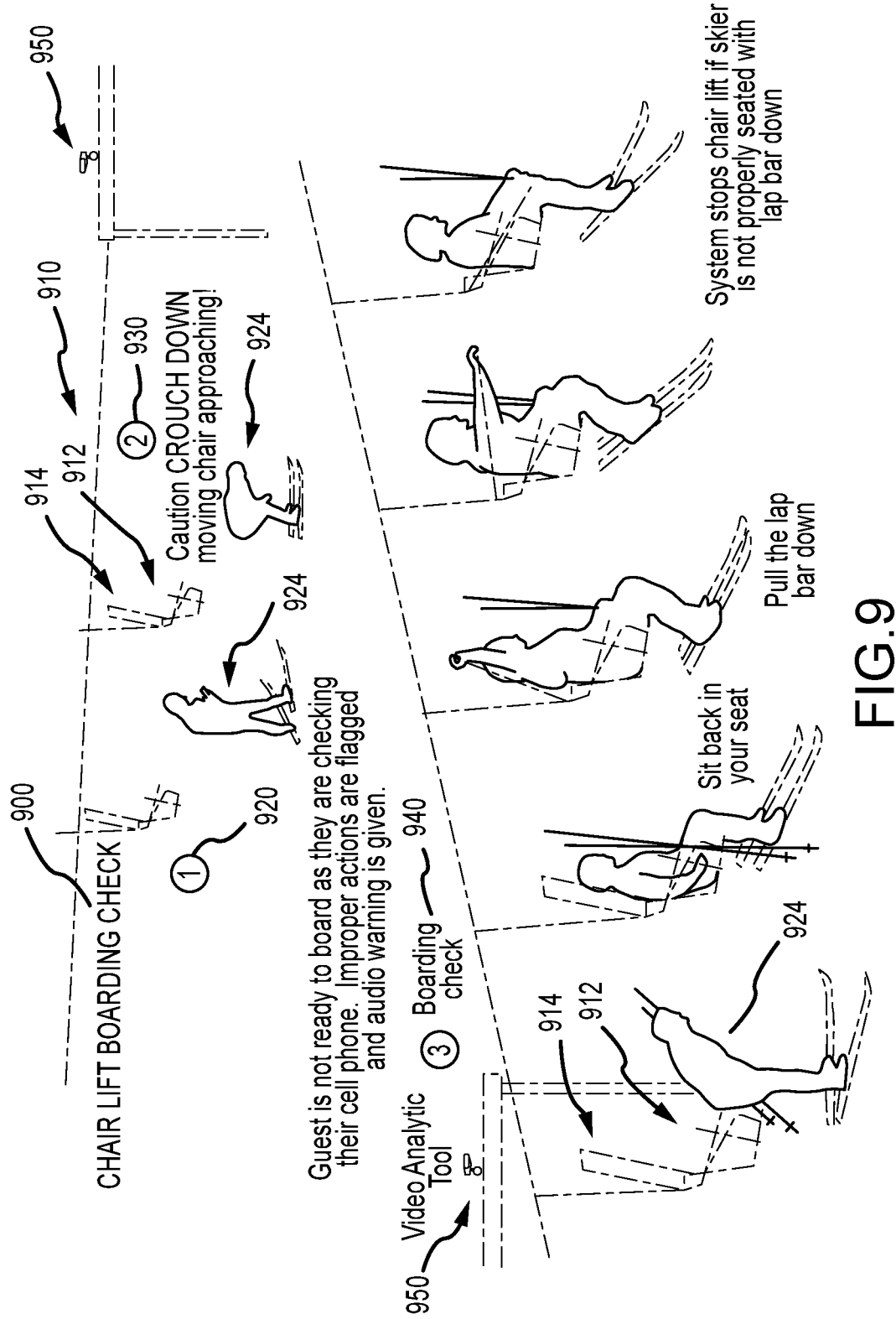
FIG. 9 illustrates three stages or operating modes of a system operable to monitor compliance with a chair lift boarding and/or operating procedure.

With regard to the third listed use case, FIG. 9 illustrates three stages or operating modes/states 920, 930, 940 of a system 950 performing a procedure compliance monitoring operation or method 900 during chair lift boarding. As shown, a passenger (e.g., a skier) 924 is in the process of boarding and then riding a chair lift 910 having a plurality of chairs 912 each with a corresponding lap bar (or other positionable mechanical restraint) 914. The system 950 (which may be an implementation of the system 600 of FIG. 6) is configured to act as a virtual ski patrol during boarding operations on the ski lift 910. In some embodiments, when a rescue or assistance of a skier 924 is determined to be needed or preferred over feedback, the system can provide a warning (feedback) to the skier 924 while concurrently (or sequentially) communicating with a ski crew or lift operator (not shown in FIG. 9).

In a first stage or operating mode/state 920, the system 950 is operating to monitor a space in which skiers 924 queue up and board the chair lift 910 (e.g., a lift line in which first in line moves into path of next available chair 912 supported on a moving cable). In a preliminary step 920, the system 950 operate on an ongoing basis to provide users/skiers 924 with feedback to properly perform the compliance step of safely moving into the path of the next available chair 912 such as by providing an audio prompt (e.g., "Caution: moving chair. Please be ready to board."). When a user/skier 924 is determined by the video image analysis (or other sensor data processing) to not be ready to board (such as when distracted as shown using a cellphone), the system 950 may operate in a second operating state or mode 930. This may involve stopping the chair lift 910 to halt the chairs 912 and/or may involve providing feedback for the flagged improper action (e.g., non-validated or verified performance of a compliance step) such as to provide an audio warning (e.g., "Caution: Crouch down now—moving chair approaching!") to the user or skier 924.

A third operating state or mode 940 may be entered by the system 950 when the first compliance step of placing yourself safely in the path of the moving chair 912 of the lift 910. In this state/mode 940, the system 950 uses its video image analytics program and lift boarding compliance application to determine that each compliance step or task is performed properly as they board the chair 924. This may include, as shown, achieving proper initial contact with the moving chair 912, sitting or scooting back into the chair 912, and pulling the lap bar 914 down to a proper restraining or lowered position (e.g., as the chair 912 rise up the hill, the user 924 typically is able to manually lower the lap bar 914) within a predefined amount of travel of the chair 912 after initial engagement.

The monitoring by the system 950 may provide validation or verification of these three compliance steps (initial engagement with chair 912 without being knocked down or falling down, sitting back to a proper ride position in the chair 912, and pulling down or positioning the lap bar 914 properly). The system 950 may, after the lap bar is positioned and/or locked in place (and other compliance steps performed), confirm a proper boarding process, and the system 950 may provide feedback to the user/skier 924 (and an observing lift operator or ski crew member) such as with green light or the like and/or simply allow the lift to continue to run. When a skier/user 924 is not properly seated or the lap bar 914 is not properly positioned and/or locked, the system 950 may provide feedback to obtain completion of one or more of the compliance steps not validated, yet (e.g., audio information on what skier/user 924 needs to do) or to indicate non-compliance (e.g., a red light and/or a warning buzzer). Further, the system 950 may stop the chair lift 910 and communicate with a lift operator and/or ski crew member to provide assistance and to manually restart the lift 910 when safer conditions exist.

Figure 10:
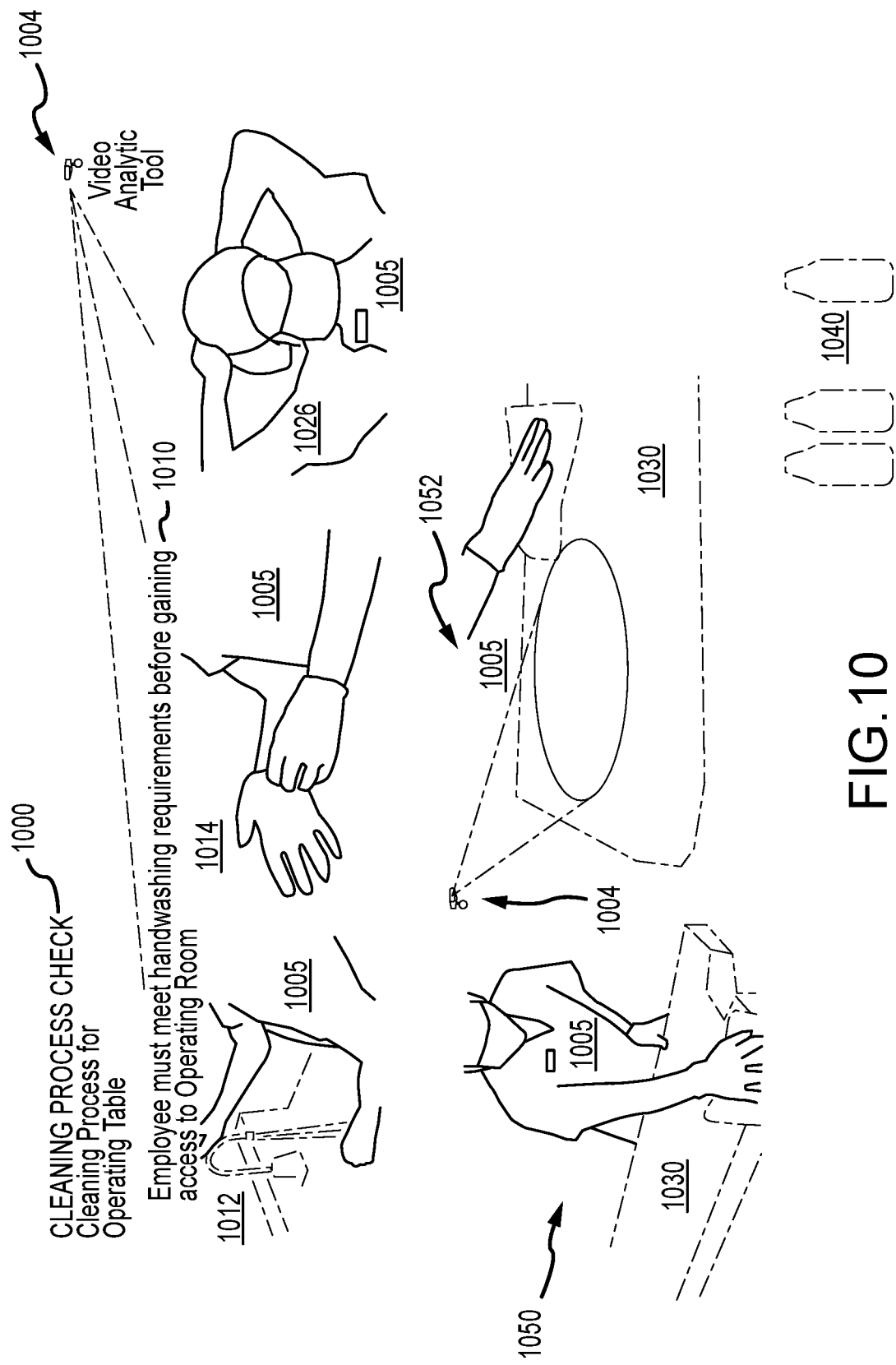
FIG. 10 illustrates a system of the present description monitoring compliance with a cleaning process for an operating table.

With regard to the fourth listed use case, FIG. 10 illustrates stages or operating modes/states of a system 1004 performing a procedure compliance monitoring operation or method 1000 for a cleaning process for an operating table 1030. As discussed above, the system 1004 is adapted to sense data pertaining to an employee or other person 1005 attempting to access a room with a surface that requires cleaning according to a defined process with one or more compliance steps. This data (e.g., biometric data, facial images for facial recognition, an ID badge with a barcode, or the like) is processed by the system to identify the person 1005, and the system 1004 then determines what requirements (process steps/task definitions) are needed for accessing a controlled area/room and performing a cleaning process, and sends training information to the person 1005 if requirements have not yet been met by the person before allowing them access to the controlled area/room. In this way, the system 1004 assures compliance with a first compliance step (complete training).

The system 1004 processes the retrieved requirements for the monitored cleaning process 1000 and determines a next compliance step 1010 is that the identified employee 1005 must meet handwashing requirements before gaining access to the controlled area (e.g., an operating room). At 1012, the system 1004 determines that training is required, and the employee identifier is scanned (or the employee 1005 is otherwise identified). Handwashing training and procedures (with its compliance steps) for cleaning a surface in the controlled area (e.g., an operating table 1030) are called up by the system 1004. At 1014, the system 1004 monitors the employee's handwashing for compliance (as discussed in detail above, for example), and, when completed to requirements, the process 1000 continues with the employee 1005 being allowed to move ahead to next steps including putting on gloves. At 1016 (which may be performed before step 1014), the system 1004 monitors the employee's actions further to verify the compliance steps of selecting proper protective clothing and donning the protective clothing (e.g., headwear, a mask, and so on) in a required manner. The validation or verification of the compliance step may be performed using video analytics algorithms run by system 1004.

The system 1004 may then allow the employee 1005 to access the controlled area (operating room in this example) such as by releasing a door locking mechanism when the employee 1005 swipes their identifying badge or key. At 1050, the system 1004 monitors the employee 1005 as they performance compliance steps of cleaning the surfaces of the operating table 1030 with cleaning solutions and equipment 1040 (also defined for the cleaning process). At 1052, the system 1004 may determine, from video analytics, that all surfaces of the table 1030 have not been cleaned as required to complete a compliance step (e.g., before moving on to other portions of the table 1030). In such a case, the system 1004 may send notification to the employee 1005 to stop and review training (provided by the system 1004 such as by display of text and/or video images on a nearby display device), and repeat missed compliance steps (e.g., repeat cleaning of prior surface of table 1030 per the training) before proceeding.

The system 1004 may perform training and status verification as part of process 1000. Training verification may involve: (a) determining training is required for entry and then determining employee 1005 has successfully completed training; (b) updating the system database when training is completed; (c) pulling up relevant documentation; and (d) providing, if needed, field site specific training to the employee 1005. Status verification may involve: (a) determining whether person 1005 met criteria to gain access to the controlled area; (b) if access was not granted to a person 1005, determining if training was sent to the person 1005; (c) determining if management responsible for employee 1005 or controlled area were notified; and (d) determining if data was collected to improve the monitored cleaning process and/or access control to the area.

In brief, during the monitoring process 1000, the system 1004 provides automatic manual critical process monitoring and control. Video biometric sensors can be used in system 1004 to monitor that the right person at the right time was attempting to access the controlled area and was able complete the right technique (performed compliance steps properly). Further, the system 1004 provides real time feedback that allows the employee to complete the entire task of accessing the operating room and properly cleaning the surfaces of the operating table. The system 1004 may be configured to provide seamless switching between multiple personnel identifiers (e.g., a bar code, a visual identifier, and the like).

Figure 11:
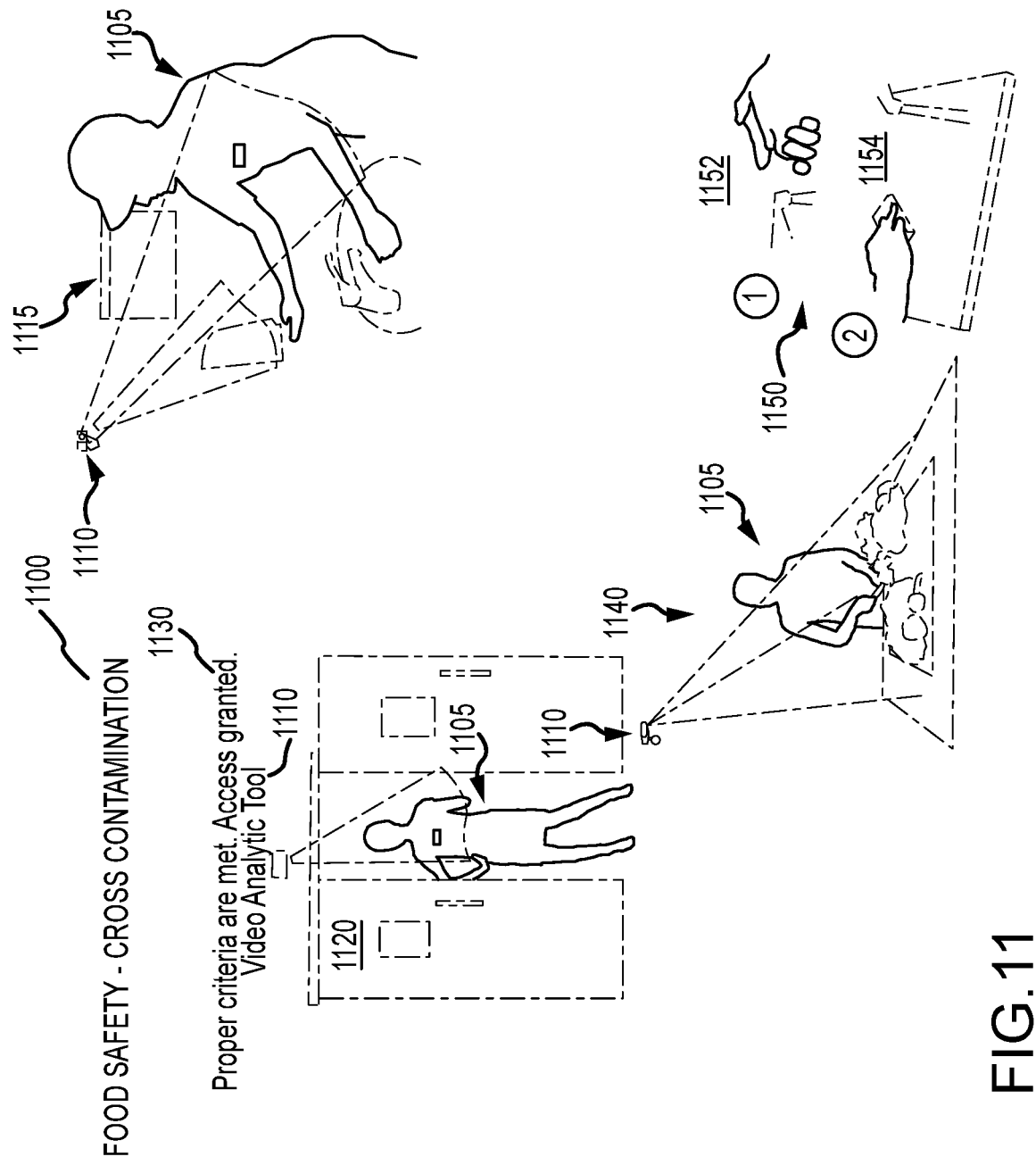
FIG. 11 illustrates a system of the present description during its use to monitor food preparation/handling process to enhance food safety.

With regard to the fifth use case listed above, a procedure compliance monitoring system 1110 is shown in FIG. 11 monitoring a food safety process 1100 to reduce risks associated with cross contamination during food preparation and/or handling. As shown at 1115, the system 1110 operates to identify an employee 1105 so that the system 1110 knows who they are and, based on this information (and, in some cases, other information such as their present location and the time of day), the system 1110 is able to look up and retrieve what requirements or compliance steps must be completed by the employee as part of the process 1100. The system 1100 sends training information to the employee 1105 if training has not been completed or as needed when compliance steps are not performed to allow validation. In this example process 1100, one compliance step is that the employee 1105 meets food safety training requirements. When this step is validated by the system 1110 for the employee 1105, the system 1110 then determines a next compliance step is to meet handwashing requirements, with such monitoring occurring at 1115.

The employee 1105 may then attempt to access a door 1120, and the system 1110 operates to verify for the employee 1105 that they are identified as someone who can access the food preparation space behind the door 1120 and that they have met the entry requirements or compliance steps (e.g., training and handwashing). If so, access is granted to the employee 1105 by the system 1110. Status verification as described above with reference to FIG. 10 may be performed by the system 1110.

Next, as shown at 1140, the employee 1105 has accessed a food preparation area (e.g., a meat cutting station), and the system 1110 operates to monitor, with video analytics and/or other processing of sensor data, the employee 1105 as they perform one or more food handling processes (which may have one or more compliance steps defined for them). If proper food handling criteria is not met (e.g., moving from one food to another without a compliance step such as using a different knife, washing hands, and so on), the system 1110 may block or deny access of the employee with the food they prepared to a next station (e.g., the kitchen). Further, the system 1110 may automatically alert a supervisor of the employee 1105 (or of the food preparation facility), and training may be delivered to the employee 1105 along with monitoring of its successful completion. At 1152 and 1154, the system 1110 is shown to be proving corrective actions (e.g., handwashing and surface washing) before food handling by the employee 1105 can be resumed.

Figure 12:
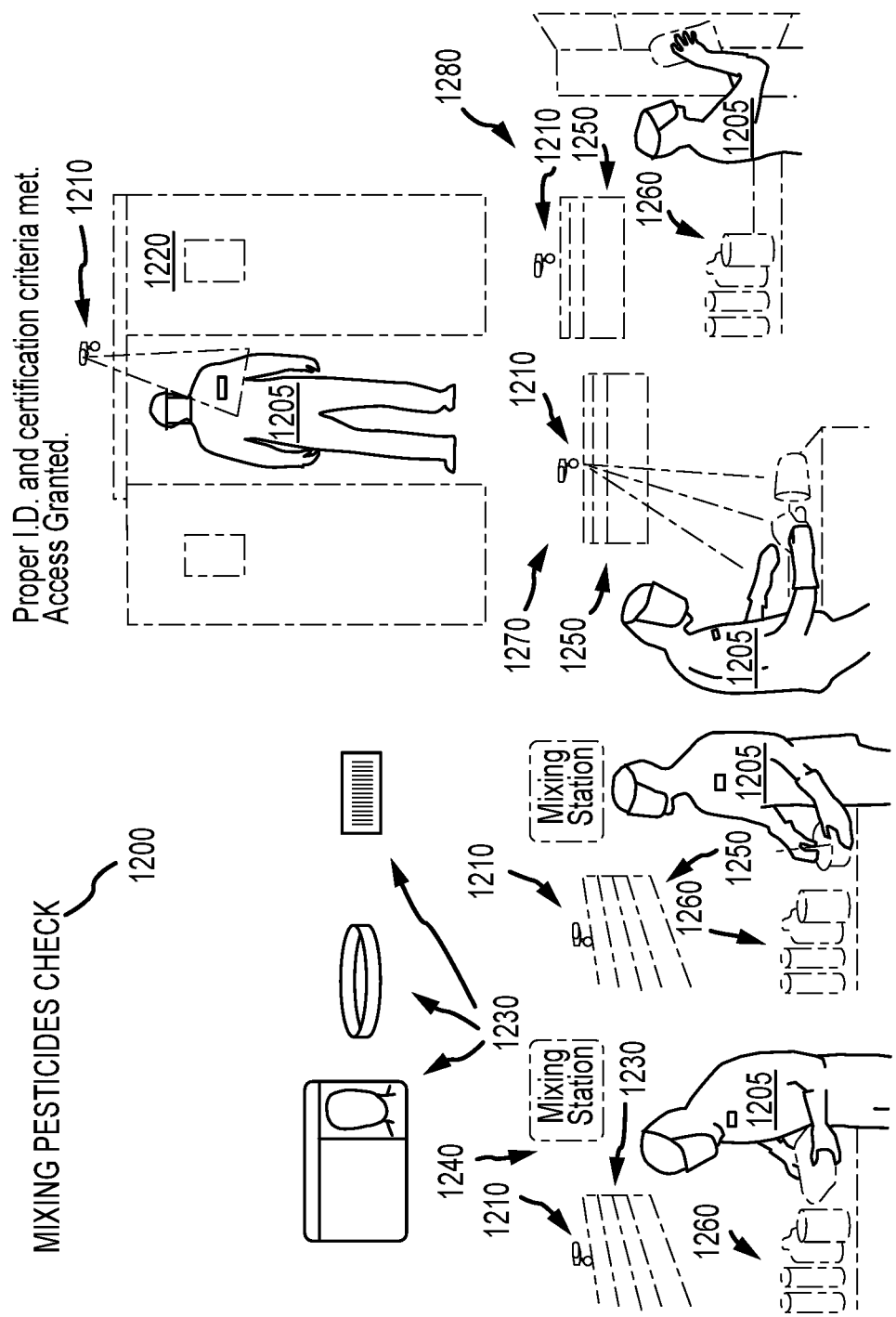
FIG. 12 illustrates a system of the present description monitoring compliance with defined requirements during a mixing pesticides process.

With regard to the sixth listed use case, FIG. 12 illustrates a process compliance monitoring system 1210 as it is used to provide a mixing pesticides check 1200. The method for monitoring chemical mixing procedures performed by system 1210 may involve: (a) automatic manual critical process monitoring and control; (b) using sensing technologies to monitor that the right person for performing the mixing is at the correct location, that they completed the right techniques, and that they were given correct real time feedback, which allows them to do the rest of their task; and (c) seamless switching between multiple personnel identifiers 1230 (e.g., a badge, a wristband, a bar code, facial or visual identifier, or the like).

As shown in the upper right hand portion of FIG. 12, the system 1210 may visually monitor an access space for a door 1220 used to limit access to a chemical mixing room or space. When an employee 1205 approaches the door 1220, the system 1210 identifies them (e.g., by facial recognition or use of a barcode or other identifier 1230 as shown), and the system 1210 determines based on this identification whether or not they are on an access list for the space and/or have the proper criteria (e.g., are the "right person" and the "right time"). If not, the door 1220 may be kept locked. If proper ID and certification criteria is met (and verified by the system 1220), the system 1210 may allow the door 1220 to be opened/unlocked and the employee granted access.

At 1240, the system 1210 continues monitoring the process 1200 after the employee 1205 has entered a chemical (e.g., pesticide) mixing station/space that includes chemicals/pesticides, cleaning solutions and tools, mixing equipment, and the like as shown generally at 1260. The station may include a display element 1250 for providing the employee 1205 information such as mixing steps, training, alerts, and the like with or without audio. The system 1210 may operate to scan an identifier 1230 or otherwise to identify the employee 1205. Chemical mixing and safety training procedures for the process are matched to the identity of the employee 1205, and the compliance step of performing the training or having already completed the training is verified or validated by the system 1210. Next, the employee 1205 then carries out the chemical mixing per displayed steps on display element 1250, and each may be a compliance step monitored by the system 1210 such as through video analytics such that the system 1210 may halt mixing if any compliance step is not verified as properly completed.

At 1270, the system 1210 determines that a spill of chemicals has occurred. The system 1210 may stop all future mixing steps and/or access to additional chemicals, tools, and/or spaces until the spill is cleaned up per one or more procedures (each with one or more compliance steps). The system 1210 may provide a spill alert, e.g., with a red or yellow flashing light and/or with audio soundtracks of warning language and/or buzzer sounds. The system 1210 monitors the employee 1205 to verify whether sensor data shows the employee is following proper procedures after a particular spill (and the compliance steps may differ depending on what mixing process was being performed when the spill occurred and/or be specific to the chemicals 1260 involved). Once the spill is contained and/or cleaned up as verified by the system 1210 (e.g., comparing video images to expected video images or the like), the system 1210 may halt alerts (and display a green light in some cases) and allow the employee 1250 to proceed with needed accesses to perform the mixing procedure(s).

Figure 13:
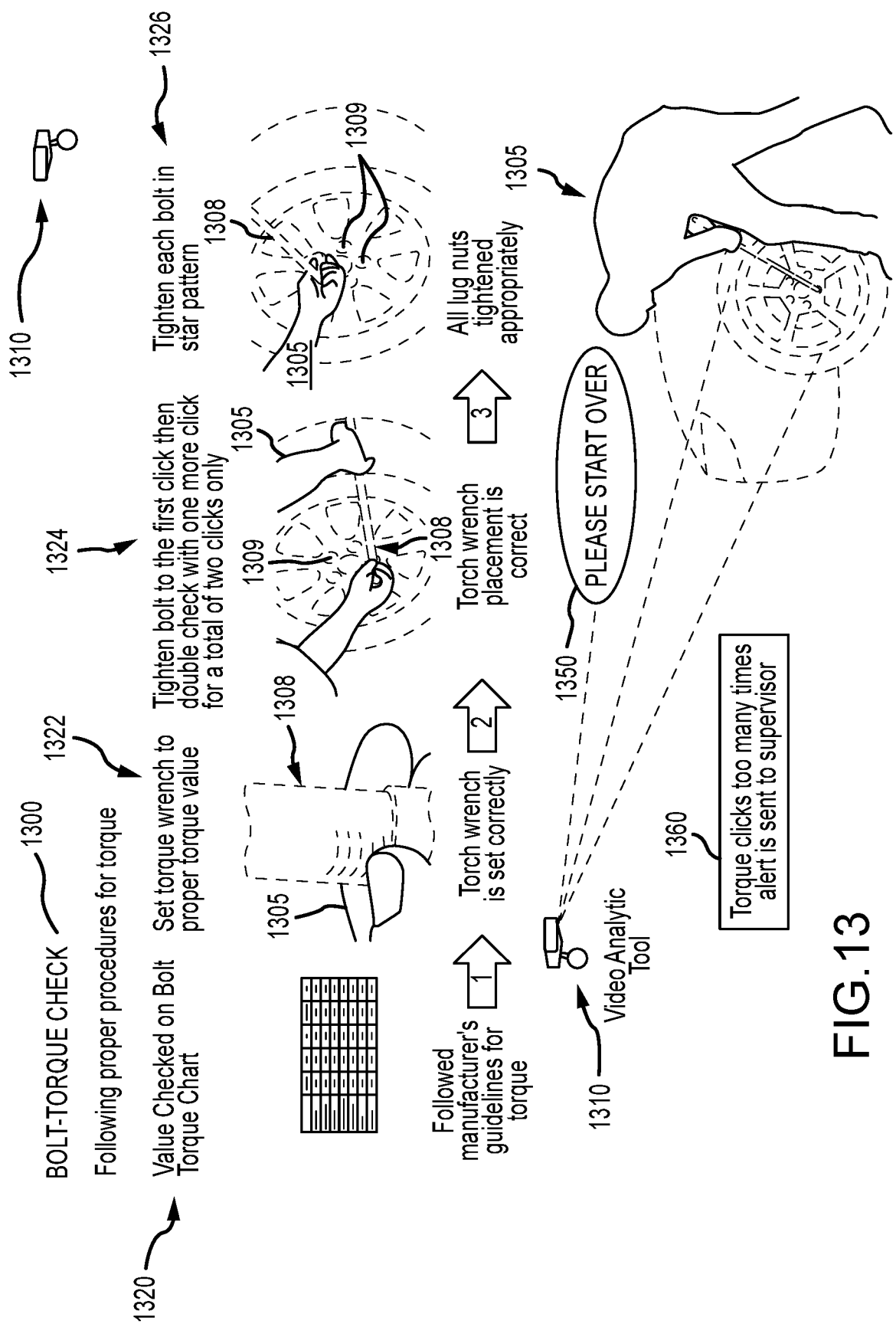
FIG. 13 illustrates a system of the present description monitoring compliance with requirements or compliance steps defined for a mechanical process such as bolt torqueing.

With regard to the seventh listed use case, FIG. 13 illustrates a monitoring system 1310 operating to provide a bolt torque check for a worker 1305. Similar monitoring can be provided for other maintenance and/or fabrication assembly processes. The system 1310 uses video analytics to verify the worker 1305 is following proper procedures for obtaining desired torques, e.g., on lug nuts used to fasten a wheel onto a vehicle. The system 1310 may at 1320 provide a look up of bolt torqueing procedures for the worker 1305 to follow for a particular piece of equipment (which may be identified based on the sensor data the system 1310 receives). This monitoring step 1320 may provide a torque value to the worker 1305 or may involve verifying the worker checked a bolt torque chart to obtain the correct torque value to follow a manufacturer's guidelines, for example.

At 1322, the system 1310 may verify through monitoring processes that the worker 1305 has chosen a proper torque wrench 1308 and set it at the proper torque value. Once the compliance step of setting the torque wrench correctly is completed, the system 1310 at 1324 may monitor the actions of the worker 1305 to verify that a next compliance step or torqueing procedure is followed such as to follow a tightening pattern defined in the requirements (e.g., tighten each lug not in a star pattern (verified through visual monitoring including video analytics), tighten each lug nut to a first click of the wrench and then double check with a second click on each lug nut for a total of two clicks (verified with audible and/or visual monitoring), and the like). At 1326, the system 1310 continues to monitor until it is determined that the torqueing procedure was followed and all lug nuts are tightened appropriately.

During the monitoring process, the system 1310 may determine that a torqueing procedure (or a particular compliance step) was not followed correctly by the worker 1305, e.g., that a lug nut was under or over torqued. The system 1310 may respond by issuing an alert 1350 to the worker 1305 (e.g., a broadcasted statement to "Please start over" or other feedback to assist the worker 1305 in completing the task properly). The system 1310 may also issue an alert 1360 to the supervisor of the worker 1305 (e.g., "Over torque indicated by too many clicks of wrench on a lug nut."). As shown in FIG. 13, the system 1310 is useful for: (a) evaluating each employee's process; (b) tracking and monitoring employees in the space used for bolt torque check; (c) monitoring worker safety (e.g., identifying potential risks through video analytics and providing alerts); and (d) sending alerts to employees and supervisors in real time to facilitate proper performance of the procedure being monitored.

Figure 14:
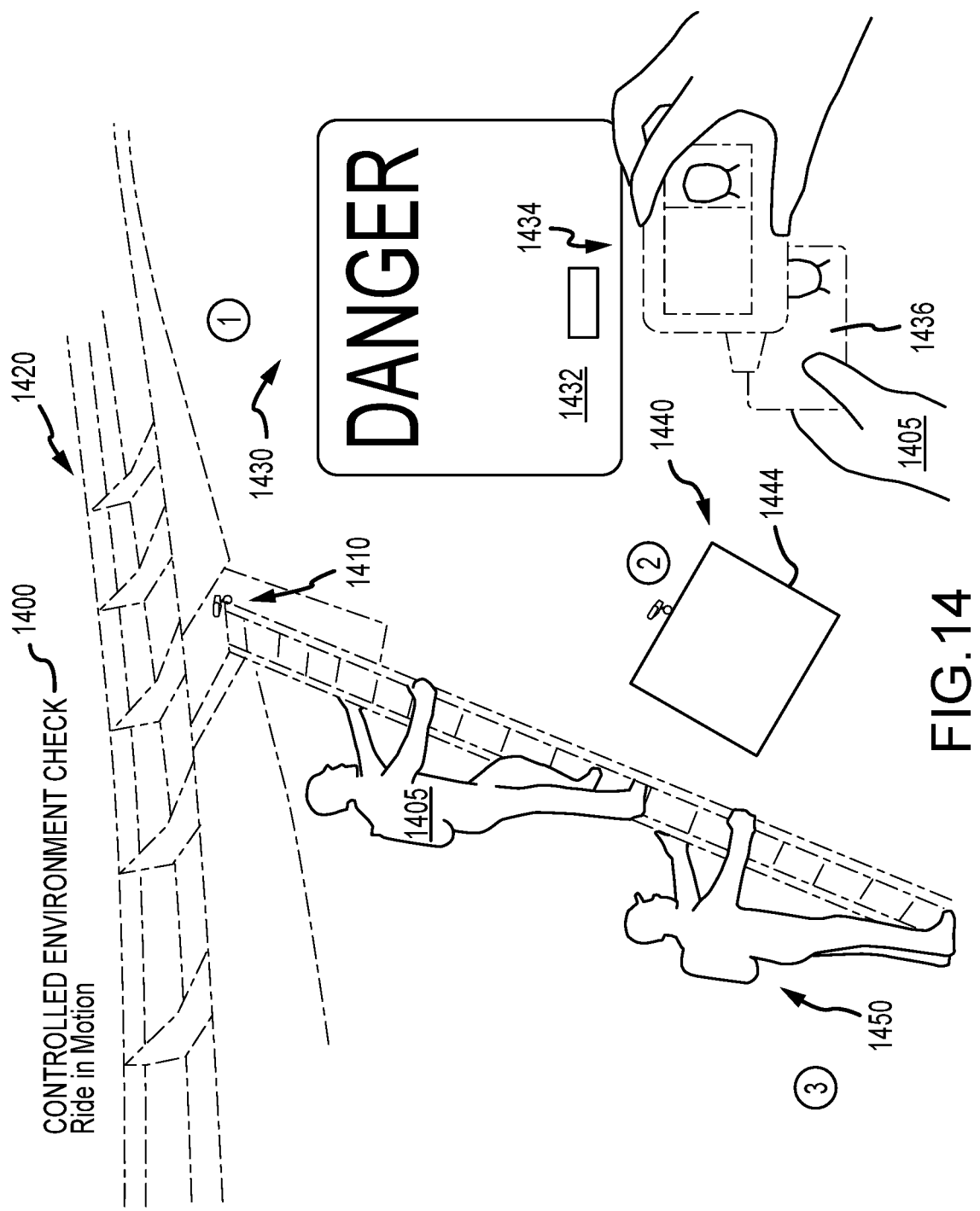
FIG. 14 illustrates a system of the present description during its use to monitor compliance with a safety procedure for a controlled environment (e.g., to prevent or limit personnel access to a space with moving machinery or equipment such as near a track of a park ride).

With regard to the eighth listed use case, FIG. 14 illustrates use of a procedure compliance monitoring system 1410 to provide a controlled environment check 1400. At 1430, the system 1410 may include a portable client device 1434 or a sensor (such as a video camera may be included). At 1430, the system 1410 is configured to look up access procedures for a space that includes a vehicle track 1420 (or other equipment that may be operating in a manner that would make access to the space potentially unsafe). These procedures may include a compliance step for a worker 1405 to complete training prior to accessing the space near the track/equipment 1420. In monitoring process 1430, the worker 1405 may use the client device 1434 to scan a barcode on a sign 1432 (or otherwise identify the sign) and to scan their badge 1436. The system 1410 communicates with (or includes) the client device 1434 to retrieve a safety plan and/or access procedures for the space (e.g., ride access procedures) near the track 1420.

At step or process 1440, the system 1410 may retrieve and offer specific procedures to the worker 1405, such as via the client device 1434, for their review before access is made to the space near or including the track 1420 (e.g., for track repairs or inspections). The system 1410 then verifies that the training and/or procedures have been reviewed or completed, and the system 1410 also monitors at 1410 to verify that the compliance steps of the access procedures are performed or followed by the worker 1405. If not, the access door 1444 may be kept locked by the system 1410 or access otherwise denied by the system 1410. A supervisor or others may also be notified of an attempted unauthorized access to the space near the track 1420.

At 1450, the system 1410 has determined that all criteria have been met or that all compliance steps for access were performed properly as verified through video analytics or the like, and the access door 1444 is unlocked and access granted to the worker 1405. This may be after verification that the ride associated with the track 1420 is stopped and a certified trained escort has arrived at the work site. In this example, status verification by the system 1410 may involve determining whether the space is safe to enter, whether the ride or equipment has been stopped or placed in a safe operating mode, and whether there is a proper escort on site. Training verification may involve determining what training is required and whether the worker associated with the badge 1436 has completed the training. Once trained, the system is updated to reflect compliance with this requirement. The system 1410 may also pull up relevant documentation (e.g., procedures to be followed to access the controlled environment near the track 1420), which may include providing field site specific training. The system 1410 may also send alerts to employees trying to access the controlled environment to provide them real time feedback to complete their task (including accessing the space), and the system 1410 may send alerts to supervisors (e.g., to indicate one of their workers has not yet received training or has completed particular training).

Figure 15:
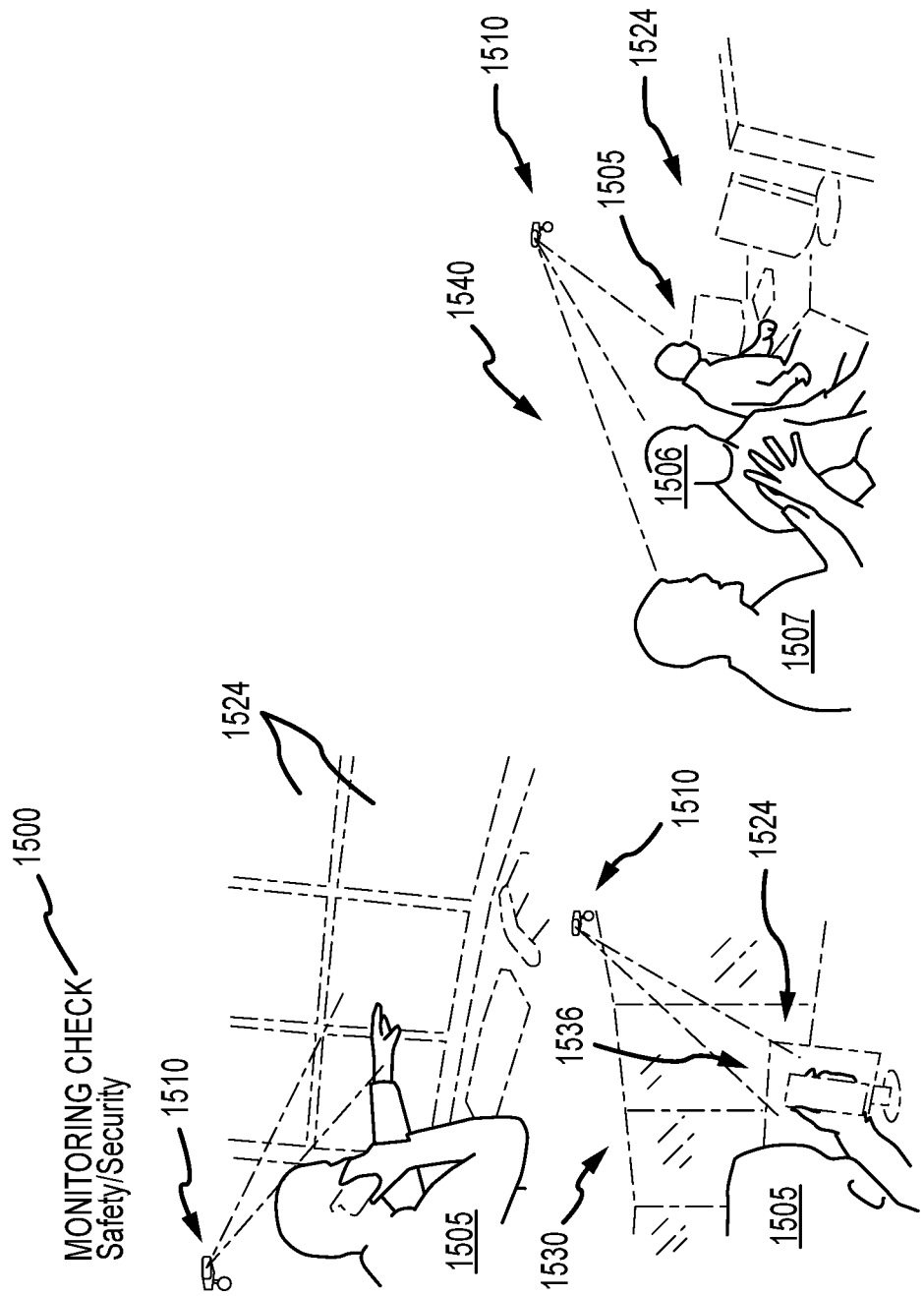
FIG. 15 illustrates a system of the present description during its use to monitor compliance with control monitoring processes.

With regard to the ninth listed use case, FIG. 15 illustrates a procedure compliance monitoring system 1510 operating to provide a monitoring check 1500. There are a number of employee tasks that involve employees performing tasks to ensure safety and/or security of a facility by observing or visually (or otherwise) monitoring display devices or monitor screens and/or other safety and/or security output devices. To this end, status verification may be performed by the system 1510 to provide: (a) determination of whether an employee is monitoring their assigned safety/security equipment (e.g., one or more display device screens); (b) determination of whether the employee is up to date on any required training; (c) determination of whether the employee is scanning their vision over all their assigned equipment (e.g., moving their eyes over two, three, or more display device screens); (d) transmittal of alerts to employees and/or supervisors to assist in completion of the monitoring tasks or to report identified issues, respectively; and Le) verification that procedures are followed properly by the employees.

In monitoring process 1520, the system 1510 operates to monitor, such as with video analytics, a worker 1505 to verify they are complying with one or more procedures (or their compliance steps). In this example, the worker 1505 is verified to be monitoring the screens 1524 and to be scanning their eyes among the screens 1524 at a predefined rate. In monitoring process 1530, however, the system 1510 is monitoring the worker 1505 and determines they are not following proper monitoring of the screen 1524. In this example, the worker 1505 (e.g., a control tower operator at an airport) is checking their personal cell phone or operating a personal device 1536 while on duty. An alert may be sounded or provided to the worker 1505 that their failure to follow a compliance step or complete a required task has been detected so as to provide immediate or real time feedback. An alert may also be provided to the supervisor of the worker 1505, e.g., an alert indicating that the noncompliance was detected but has been corrected (or not) by the worker 1505.

In monitoring process 1540, the system 1510 may determine, via ongoing monitoring with its video analytics algorithms, that worker 1505 is properly monitoring their assigned screen(s) 1524 but also that security operators 1506 and 1507 are failing to perform a compliance step or task. Specifically, the system 1510 may determine the workers 1506 and 1507 are looking away from their assigned screens 1524 for an extended period of time (and/or are facing each other and/or are talking to one another). Their behavior may be flagged by the system 1510 and/or an e-mail, a text message, or other alert set to the appropriate supervisor(s).

Figure 16:
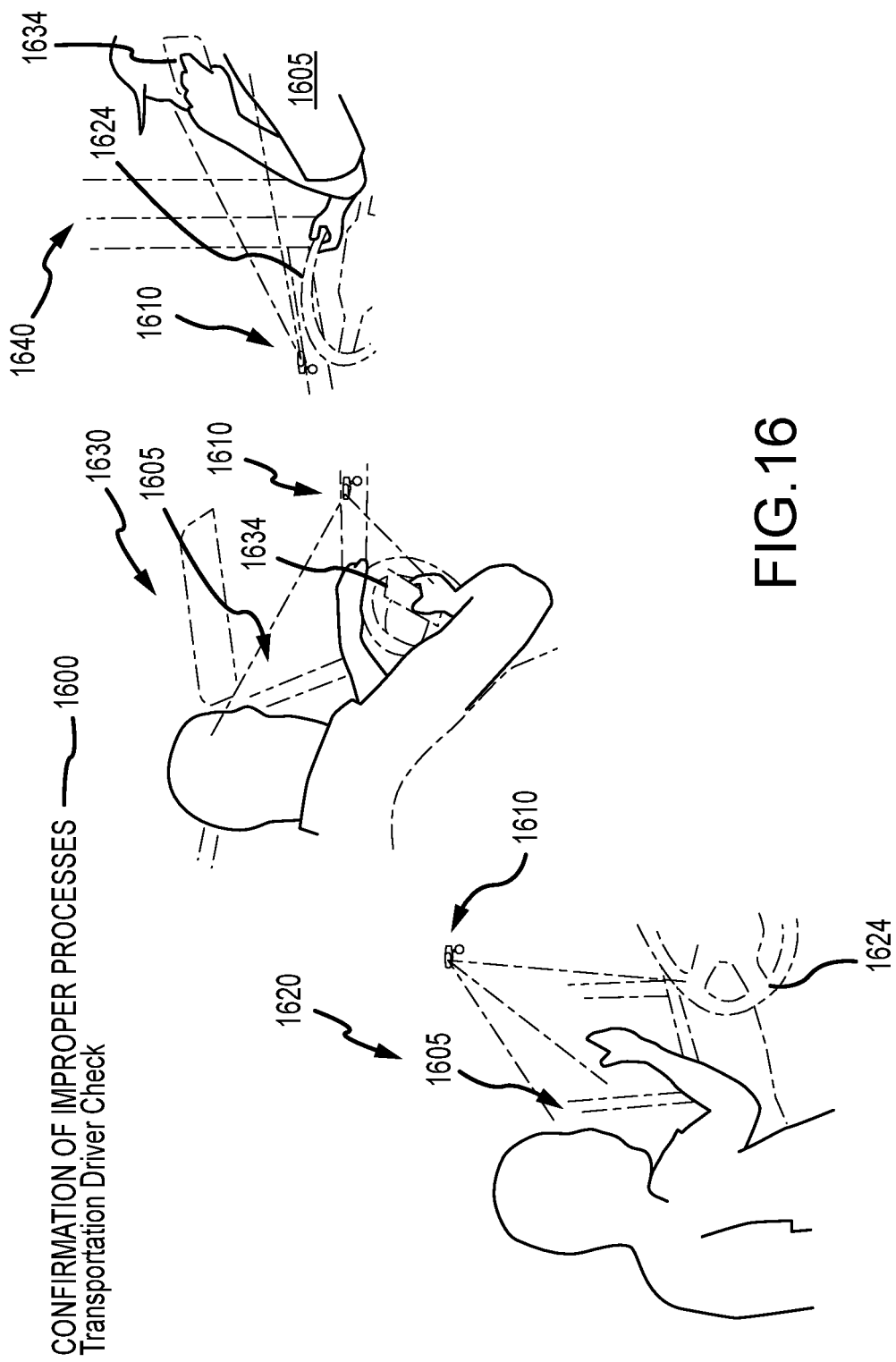
FIG. 16 illustrates a system of the present description during its use to monitor compliance with driving procedures.

With regard to the tenth listed use case, FIG. 16 illustrates three operating modes or processes 1620, 1630, and 1640 for a procedure compliance monitoring system 1610 as it is being used to provide a transportation driver check (or confirmation of improper processes) 1600. The system 1610 may, as shown, be operated to perform a method for monitoring drivers of vehicles by: (a) providing automatic manual critical process monitoring and control; (b) monitoring, using sensing technologies, that the right person is driving a vehicle at a particular time, that the person/driver is completing proper driving techniques/processes, and that the correct real time feedback was provided to the person/driver to allow them to complete a driving task(s); and (c) providing seamless switching between multiple personnel identifiers (e.g., a badge, a wristband, a bar code, a visual identifier, and the like).

In monitoring process 1620, the system 1610 may identify a driver 1605 as being the right driver for a particular vehicle at a particular time (e.g., an operating shift for the vehicle). However, the system 1610 may use video analytics to determine the driver 1605 has taken their hands off the steering wheel and/or has taken their eyes off the road for an extended time exceeding a predefined maximum time, and these determinations may mean the driver 1605 is failing to complete two compliance steps. The system 1610 may respond with an alert to a supervisor and with an alert to the driver 1605 along with corrective actions. In this example, a red light may flash in system 1610 with an audio message (e.g., over a speaker or an earpiece worn by the driver 1605 instructing the driver 1605 to keep their hands on steering wheel 1624 and eyes on road).

In monitoring process 1630, the system 1610 may detect through video analytics that the driver 1605 is failing to perform a compliance step because they are texting on a device 1634 while driving. The system 1610 is able to determine that the vehicle is moving (or simply the engine is running) such that the compliance step of not texting is in force. The system 1610 may respond by sending an alert to the driver 1605 such as with a red flashing light and/or with audio output (e.g., "Stop texting immediately."). The system 1610 may also send a notification to the driver's supervisor, and it can also collect performance metrics for each driver 1605 for later review. In monitoring process 1640, the system 1610 may determine that a driver 1605 is talking on a cellphone 1644 while driving. The system 1610 may respond by sending an alert to the driver 1605 such as with a red flashing light and/or with audio output (e.g., "Stop talking on your cellphone."). The system 1610 may also send a notification to the driver's supervisor.

In this example, status verification may involve: (a) determining that employees/drivers are monitoring the road; (b) verifying the driver's training is up to date; (c) determining when the drivers require corrective training; (d) sending alerts to the drivers and their supervisors as appropriate during the monitoring; and (e) verifying the drivers follow procedures properly before allowing them access back to their vehicle.

Figure 17:
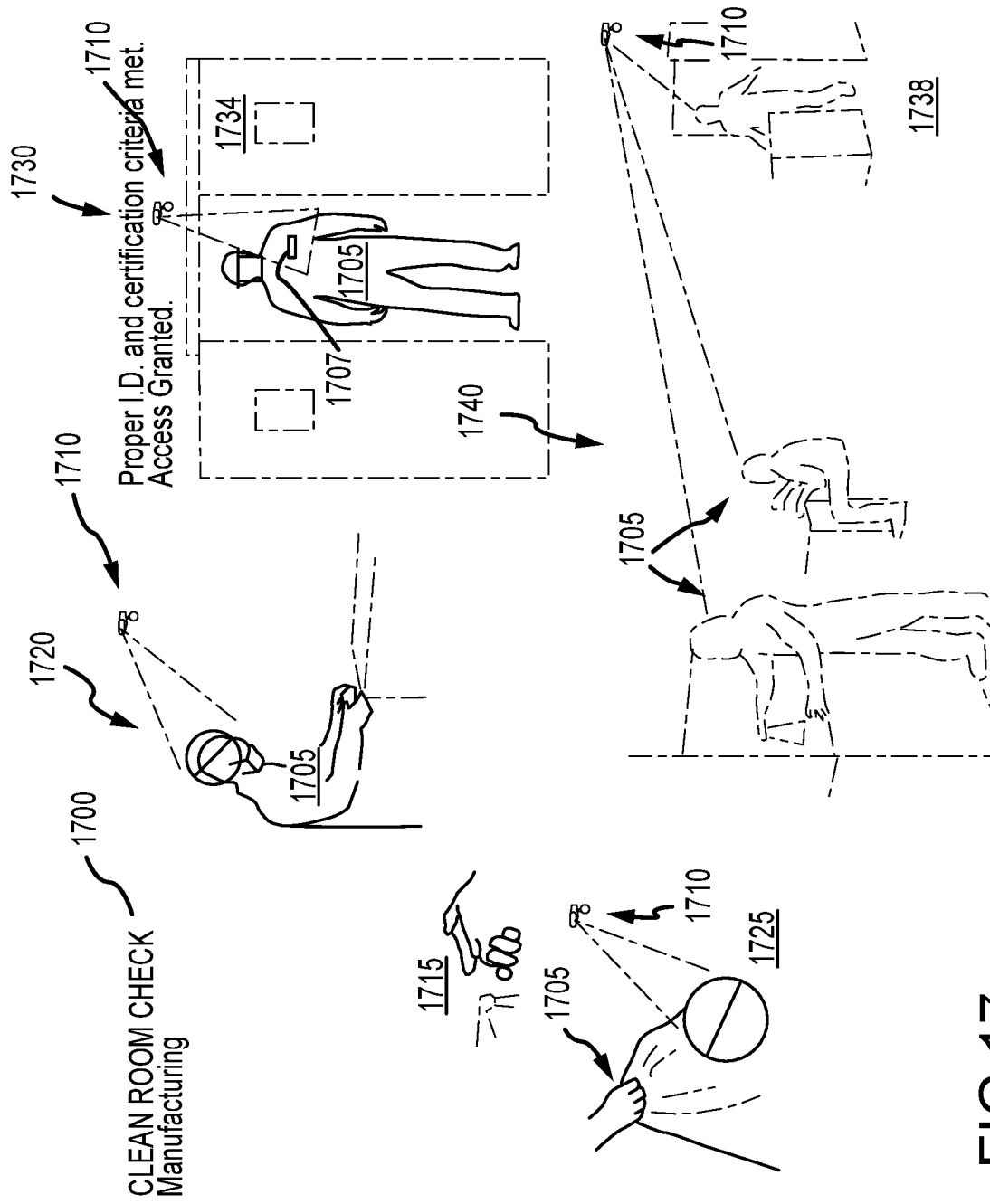
FIG. 17 illustrates a system of the present description during its use to monitor compliance with clean room procedures.

With regard to the eleventh listed use case, FIG. 17 illustrates a procedure compliance monitoring system 1710 being used to provide a clean room check 1700 as may be useful in many manufacturing and experimental laboratory settings. The system 1710 may operate to provide a method of monitoring clean room procedures, and the method may involve: (a) providing automatic manual critical process monitoring and control; (b) using sensing technologies to monitor that only the right workers at the right time are allowed access to a clean room, that the each worker has completed training and performs clean room processes using correct techniques as taught in training, and that the correct real time feedback was provided to the worker to assist them in completing their assigned tasks; and (c) providing seamless switching between multiple personnel identifiers (e.g., a badge, a wristband, a bar code, and a visual identifier).

For example, in monitoring process 1720, the system 1710 may monitor actions by the worker 1705 in preparing to enter a clean room. The monitoring by system 1710 may including performing video analytics to verify that compliance steps for a method of donning protective clothing and/or gear is followed by the worker 1705. In process 1720, the system 1710 may determine that contamination is possible because the worker 1705 has failed to don a hood. The system 1710 may block access to the clean room and provide an alert/feedback to the employee 1705 (e.g., "Contamination Warning: Do not proceed. Please report back to the Gowning Area as this area requires a hood."). The worker 1705 may also be provided with clothing requirements and/or gowning procedures as feedback. If the worker 1705 is exiting the clean area, the system 1710 may also provide the worker 1705 with decontamination procedures to follow due to possible contamination.

In monitoring process 1725, the system 1710 may monitor the donning by the worker 1705 and identify an improper practice or failure to complete a compliance step. For example, as shown, the worker 1705 may have allowed a clean gown to touch the floor. The system 1710 may, in response, generate an alert/feedback to take corrective actions to avoid potential contamination and be blocked from access to the clean room until these are completed (e.g., "Contamination Alert: Do not touch clean gown to floor. Please deposit gown in receptacle and select a clean gown.").

In monitoring step 1730, the worker 1705 has donned all their protective clothing and gear and are presenting themselves at an entry door 1734 limiting access to a clean room. The system 1710 may scan the employee's identifier 1707 (or otherwise determine the identity of the employee 1705). Training is typically required for access, and the identity is used to determine if the employee 1705 is up to date on the clean room training. If not, the system 1710 will block access through the door 1734. The access procedures may include handwashing, and training for this may be called up and provided to the worker 1705 (prior to step 1730), and, in 1715, the system 1710 may operate to monitor and verify the handwashing was completed as required by the procedures defined for the clean room. If the employee 1705 is determined by the system 1710 to have proper ID 1707 (e.g., is an employee who is allowed access to the room at this time/day) and has complied with compliance steps (e.g., handwashing 1715, donning of clothing/gear at 1720, and completed training for work to be performed in the clean room), the system 1710 grants access (e.g., allows door 1734 to be unlocked by the worker 1705).

Monitoring process 1740 may be performed by the system 1710 to verify ongoing compliance with requirements of procedures in the clean room by the workers 1705 granted access via door 1734. The monitoring process 1740 may involve the system 1710: (a) evaluating with video analytics or other techniques each employee's processes (e.g., mixing processes, assembly processes, handling of materials or tools, cleaning surfaces, cleaning up spills, and so on); (b) tracking and monitoring movement of employees (e.g., verifying workers are at proper work stations, workers are performing tasks assigned while at workstations, and so on); (c) monitoring worker safety and alerting workers to any potential risks; and (d) sending alerts to employees and supervisors pertaining to results of monitoring (e.g., provide feedback to employees in real time to assist in performing a task correctly).

It should be noted that the various functions described herein may be implemented using instructions stored on a device readable storage medium such as a non-signal storage device that are executed by a processor. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device.

In some cases, the devices or components referred to herein communicate by a connection facilitated through network, e.g., a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

As will be understood from the above description, there are a wide variety and large number of different ways that the video images could be captured and processed for any of the use cases. For example, for an individual handwashing sink or ski-lift verification, the overall system could be self-contained in one box containing image capture, analysis processing, and storage and feedback processing, and the one box could be connected to local cameras and feedback devices (speakers or lights). It could also include a local video display for automatically playing back the proper technique as a training refresher. In a large commercial kitchen or manufacturing facility, individual cameras and local video displays, speakers, and lights could be spread throughout the kitchen with the servers and processors for analysis and feedback in a central room. In any of the above examples, the video images could also be sent to a network or cloud based processor and the feedback, permissions, and interlocks necessary to go to the next step could be returned to the local system.

In another configuration, such as bolt torqueing, everything could be wearable or carried by the person. For example, the camera could be on a hard hat, built into AR glasses, or be simply part of a cell phone or mobile device that is pointed at the required elements. The processing could be local within a mobile device or sent to a network or cloud based processor.

We claim:

1. A system for monitoring compliance with a procedure, comprising:
    a sensor sensing data pertaining to an interaction between a human actor and an identifiable object; and
    an analytics platform running on a computer, wherein the analytics platform performs:
        determining an identity of the human actor based on an identifier in the data from the sensor;
        retrieving a definition of a procedure to be performed by the human actor using the identity of the human actor from the determining, the procedure definition including a compliance step to be performed prior to additional steps of the procedure;
        processing the data from the sensor during performance of the procedure to verify completion of the compliance step;

when the processing indicates actions by the human actor in the interaction invalidate performance of the compliance step, initiating an action to stop performance of the procedure by the human actor; and when the initiating is complete, providing real time feedback to the human actor regarding performance of the compliance step via a device positioned in a space in which the identifiable object is positioned, wherein the device providing the real time feedback is not worn by the human actor, wherein the analytics platform further performs determining a location of the human actor in the space, and wherein the definition of the procedure is selected by the analytics platform based on both the identity of the human actor and the location of the human actor.

2. The system of claim 1, wherein the sensor comprises a video camera and wherein the data from the sensor comprises a video of the interaction, and wherein the processing of the data from the sensor includes performing video analytics using the video of the interaction.

3. The system of claim 1, wherein the real time feedback comprises an indication that the compliance step was completed improperly and instructions on repeating performance of the compliance step according to a set of requirements.

4. The system of claim 1, wherein the analytics platform further performs, after the providing of the real time feedback, processing of the sensor data captured by the sensor to verify completion of the compliance step and, in response, allowing the additional steps of the procedure to be performed by the human actor.

5. The system of claim 1, wherein the definition of the procedure further comprises a compliance step that has been completed by the human actor prior to performance of the procedure by the human actor and wherein the system further performs, before the performance of the procedure, verifying the human actor has completed training associated with the procedure and when determined to be incomplete providing information on the training and halting the procedure until the training is verified completed by the human actor.

6. The system of claim 1, wherein the compliance step comprises handwashing according to a set of requirements or completing training required for performing the procedure.

7. The system of claim 1, wherein the real time feedback is provided during performance of the compliance step and includes information identifying a variance by the human actor during the interaction from a requirement of the compliance step and information for correctly performing the compliance step.

8. The system of claim 1, wherein the procedure comprises a passenger loading procedure for a ride vehicle, a passenger loading vehicle procedure for a boat ride, a chair lift boarding procedure, a cleaning process for surfaces of an object, a food handling or preparation procedure, a mixing chemicals procedure, a fastener tightening procedure, a controlled environment maintenance access procedure, a safety or security monitoring procedure, a vehicle driving procedure, or a clean room access and use procedure.

9. The system of claim 1, wherein the analytics platform further performs determining a time when the human actor is in the space and wherein the definition of the procedure is selected by the analytics platform based additionally upon the time.

10. The system of claim 1, wherein the compliance step is one or more steps selected from the group consisting of: having previously received training; fastening a restraint; human verifying fastening of a restraint; positioning of humans with respect to equipment; configuring safety gates; wearing predefined clothing; wearing predefined equipment; and cleaning an operating table.

* * * * *